United States Patent [19]

Monzyk

[11] Patent Number: 5,030,427

[45] Date of Patent: Jul. 9, 1991

[54] GALLIUM PURIFICATION

[75] Inventor: Bruce F. Monzyk, Maryland Heights, Mo.

[73] Assignee: Monsanto Company, St. Louis, Mo.

[21] Appl. No.: 199,079

[22] Filed: May 26, 1988

Related U.S. Application Data

[60] Continuation-in-part of Ser. No. 125,822, Nov. 23, 1987, which is a division of Ser. No. 937,849, Dec. 4, 1986, Pat. No. 4,741,887.

[51] Int. Cl.$^5$ .............................................. C22B 58/00
[52] U.S. Cl. .................................... 423/112; 423/114; 423/122
[58] Field of Search .............. 423/112, 114, 122, 124, 423/128, 132, DIG. 14; 75/101 R, 63

[56] References Cited

U.S. PATENT DOCUMENTS

| | | | |
|---|---|---|---|
| 3,224,873 | 12/1965 | Swanson | 75/101 |
| 3,831,351 | 6/1974 | Lucid | 423/9 |
| 3,966,568 | 6/1976 | Crossley et al. | 204/105 R |
| 3,971,843 | 7/1976 | Helgorsky et al. | 423/112 |
| 4,026,771 | 5/1977 | Wagenknecht | 204/105 R |
| 4,193,968 | 3/1980 | Sullivan et al. | 423/112 |
| 4,362,560 | 12/1982 | Abrjutin et al. | 75/63 |
| 4,372,923 | 2/1983 | Helgorsky et al. | 423/112 |
| 4,741,887 | 5/1988 | Coleman et al. | 423/112 |
| 4,759,917 | 7/1988 | Coleman et al. | 423/112 |

FOREIGN PATENT DOCUMENTS 245736  12/1985  Japan ................... 423/112

OTHER PUBLICATIONS

Xiang et al., *Acta Metalurgica Sinica*, 18 (2), 221 (1982) English translation only.

Bird et al., "Production of High-Purity Gallium from Scrap Gallium" Chapter 7, pp. 59–63.

Lysenko et al., "Removal of Microimpurities from Gallium", pp. 501–506 All-Union Mining and Metallurgical Institute for Nonferrous Metals.

*Primary Examiner*—Theodore Morris
*Assistant Examiner*—Edward Squillante
*Attorney, Agent, or Firm*—Thomas E. Kelley; Richard H. Shear; Wendell W. Brooks

[57] ABSTRACT

Gallium is purified by washing organic solutions containing hydroxamic acid complexes of gallium with aqueous solutions, individually or in series, especially amine or ammonia solutions, and dilute acid solutions. The method is applicable to a variety of gallium sources, and capable of producing gallium of extremely high purity, especially with a repetitive procedure.

21 Claims, No Drawings

GALLIUM PURIFICATION

This is a continuation-in-part of application Ser. No. 07/125,822, filed Nov. 23, 1987, a division of Ser. No. 06/937,849, filed Dec. 4, 1986 and issued as U.S. Pat. No. 4,741,887.

The present invention relates to purification procedures for gallium involving solvent extraction techniques. In particular, it involves use of aqueous washing procedures to remove impurities from gallium complexed with hydroxamic acid extractants, and is capable of producing gallium of extremely high purity.

BACKGROUND OF THE INVENTION

Gallium is a valuable metal having important uses in electronic applications. Such applications generally require ultrapure forms of gallium as even trace impurities can have radical effects upon electronic properties. A wide range of crude gallium sources exists with variety in the identity and quantity of impurities present, as for example, certain impurities which are not present in virgin (primary) gallium sources, may be present in recycled (secondary) gallium sources. Particular impurities have generally required the use of particular purification procedures. For example, both melt crystallization and electrorefining have a fair number of impurities which follow the gallium through the processing and are not removed. This limits the usefulness of such procedures for general application to all gallium sources, and necessitates special procedures for the particular problem impurities. Thus, it would be advantageous to have a purification procedure of general applicability to gallium sources to remove practically all metal impurities.

Solvent extraction hydrometallurgy has bee used to recover valuable metals, and such procedures have been disclosed for recovery of gallium. However, such procedures have not found prominent use for purification of gallium by removal of metal impurities from gallium sources.

Xiang et al in *Acta Metallurgica Sinica* 18 (2), 221, (1982) describe the use of a certain undefined fatty hydroxamic acid for the recovery of gallium from aqueous acid solutions.

Iwaya, Japanese Patent No. SH060 (1985) 245736, Appln. No. SH059 (1984) 101504, published Dec. 5, 1985, discloses a method of recovering gallium, using hydroxamic acid resins, described as having —C(O)N-HOH groups, from high-basicity aqueous sodium aluminate solutions. U.S. Pat. No. 3,821,351 issued June 28, 1974 to M. F. Lucid discloses certain N-substituted hydroxamic acids useful as extractants for the recovery of copper, molybdenum, uranium, iron and vanadium.

A commonly assigned patent, U.S. Pat. No. 4,567,284, to Bruce F. Monzyk and Arthur A. Henn claims cobalt complexes of N-alkylalkano hydroxamic acid and involves use of such acids as cobalt extractants.

A commonly assigned application of James P. Coleman, Bruce F. Monzyk, and Charles R. Graham discloses solvent extraction procedures employing N-organohydroxamic acid extractants for recovery of gallium, and in general the procedures and agents described in that application are useful in the present invention; see Ser. No. 937,849 filed Dec. 4, 1986.

A commonly assigned copending application of Coleman and Monzyk [43-21(6836)A] filed Feb. 24, 1987, describes methods for oxidative dissolution of gallium arsenide, with preferable procedures involving use of hydroxamic acid and hydrogen peroxide, and such procedures will be useful in converting gallium arsenide source material into a form suitable for use in the present invention.

A number of other approaches to purification of gallium are known. Thus, Abrjutin et al, U.S. Pat. No. 4,362,560 discloses a vacuum-thermal decomposition process for treating various high grade gallium arsenide wastes, and also references various prior art procedures. Bird et al, *Production of High Purity Gallium From Scrap Gallium*, SME mini-symposium on "The Hydrometallurgy of the Rarer Metals", Dallas, 1982, pp. 59–64, describes various sources of gallium arsenide scrap and a process to produce high purity gallium therefrom; the process includes disassociation by leaching in hot aqua regia (4HCl:1 HNO$_3$), and neutralization of the acid solution with NaOH to precipitate Ga(OH)$_3$.

Electrowinning and electrorefining are widely used procedures for recovery and purification of various metals, and the electrochemical purification of gallium has been described in an article by Lupenko and Tryb, "Removal of Microimpurities from Gallium", J. Appl. Chem., USSR 38 (3), 501 (1965). An improved process is described by John H. Wagenknecht in U.S. Pat. No. 4,026,771. The electrolytic processes are useful but have certain limitations, such as not being applicable to non-metallic feeds or for removal of some metals close to gallium in the electromotive series and unsuitability for removal of a number of common impurities. However, the electrolytic processes are useful in conjunction with the present invention for converting the purified gallium product to metallic form, and in some instances for further purification or removal of particular residual impurities.

SUMMARY OF THE INVENTION

The present invention involves the purification of gallium by washing a solution of N-organohydroxamic acid complexes of gallium to remove metal impurities. In a particular aspect, the invention involves scrubbing an organic solution of hydroxamic acid complexes of gallium with an aqueous amine or ammonia solution to complex and remove metal impurities. In another aspect, the invention involves washing an organic solution of gallium hydroxamic acid complex with a dilute aqueous acid solution to remove impurities. The invention further involves contacting a gallium hydroxamic acid complex with Ga ion, so as to have Ga in excess of one atom for each three hydroxamic acid moieties, and crowding metal impurities off hydroxamic acid complexes, and separating an aqueous phase with impurities from an organic hydroxamic acid phase. The invention further involves a process in which gallium is loaded onto a hydroxamic acid extractant by extraction from an aqueous acid solution, and the hydroxamic acid extractant solution containing the gallium is then subjected to purification procedures involving crowding off impurities with excess gallium, scrubbing with aqueous amine, ammonia, or other solutions to remove metal impurities, and further washing with water and dilute aqueous acids. The purification process can utilize various primary and secondary sources, including sources with wide varieties and quantities of various metallic and other impurities, including metals which are not satisfactorily removed in some of the other known purification procedures, and some metals which interfere in electrowinning and electrorefining processes for recovery and purification of gallium. The present process is useful for removal of large amounts of impurities, and also for removal of minute amounts of impurities in order to obtain high purity gallium. In a special aspect, the present invention can utilize sources of gallium which have been deliberately seeded with relatively low amounts of various metallic impurities, in order to have consistent distribution of low level impurities, generally undetectable, in the purified gallium product, rather than having extremely low residual impurities which vary with the source of the gallium. The purification procedures of the present invention can produce gallium in useful salt, hydroxide and oxide forms, but the invention also involves converting the gallium to forms useful in electrowinning or electrorefining processes to recover gallium as the pure metal; particular procedures involve converting salt solutions, such as solutions of gallium sulfate, to potassium gallate solutions for electrowinning.

In a further aspect, the invention involves use of a general wash procedure to remove impurities from a hydroxamic acid gallium complex containing substantial amounts of particular metal impurities, such as soft metal impurities, or impurities of identity and amount to be difficultly removable in electrorefining procedures.

DETAILED DISCLOSURE

The present invention provides a process for purification of gallium which has a number of advantages. Among the advantages are the broad range of gallium sources to which the process can be applied, and the flexibility and tunability of the process for application to particular sources. The process involves selectivity with respect to various impurities, depending, to some extent, upon such variable controls as pH and hydroxamic acid employed, and there is no apparent practical limit upon the degree of purification obtainable.

The purification procedure to obtain pure gallium from crude gallium sources generally involves a series of procedures, although particular procedures can often be omitted, if desired, depending upon the impurities present and the degree of purification desired. The general process includes:

A. Preparation of aqueous gallium feed for use in solvent extraction.
B. Solvent extraction purification.
  1. Loading
  2. Purification
    a. Crowding
    b. Scrubbing
    c. Washing
  3. Stripping.

Following the solvent extraction, the solution of gallium product, generally in salt form, can be prepared for electrowinning or other procedures for recovery as gallium metal. The present invention is mainly concerned with the purification aspects of the overall process, but the earlier steps have an effect upon, or can be particularly tailored to fit, the purification procedures.

The purification process utilizes an organic solution containing gallium complexed with hydroxamic acid, and this organic solution is generally obtained by extracting an aqueous phase containing gallium, with an organic phase containing hydroxamic acid. Processes for performing the extraction have been described in the aforesaid patent application Ser. No. 937,849, and the procedures and agents taught in the said application, which is incorporated herein by reference, are generally applicable in the present invention.

To load gallium onto an hydroxamic acid, an aqueous solution containing gallium is blended with an organic solution containing a hydroxamic acid, preferably an N-alkylhydroxamic acid. Thus, an organic phase, such as 2.0–30% or so by weight N-alkylhydroxamic acid in a kerosene-type solvent, such as Kermac 470B petroleum distillate fraction, can be combined with an aqueous phase, such as an aqueous sulfuric acid solution containing, for example, about 40–55 grams/liter gallium. Slow stirring without blending can be employed, in a heated vessel, until the phases reach an approximate thermal equilibrium. A slightly elevated temperature during the loading and extraction contributes to good extraction kinetics and phase disengagement, but it is not necessary to exceed 60° C. for this purpose, and further desirable not to exceed about 70° C. in order to avoid unnecessary extractant degradation. While slightly elevated temperatures are preferred for the stated reasons, the extractions can nevertheless be effected at higher or lower temperatures, if desired. After thermal equilibrium is attained, the aqueous and organic phases are blended, as by stirring at about 60–120 rpm, and concentrated ammonia (or caustic) is added to raise the pH. This may take about 30 minutes, and the final aqueous gallium level should be less than about 2%, preferably less than 1%, of the original feed. The final pH should be at least about 2, and preferably above about 3, to insure a high percentage extraction of gallium. An equilibrium pH over 7 would provide the lowest losses of gallium, but use of lower pH's, i.e., 2–3, or 3–4, or 4–5, lessens impurity pick-up. It may prove advantageous to use a relatively high pH during initial loading, and then use a lower pH during a subsequent crowding step, as a high residual gallium content can be tolerated in an aqueous stream which will be recycled to the loading step. High pH can help phase disengagement during loading, but there is no reason to exceed a pH of 8–9 for this purpose. In the loading procedure, an amount of extractant can, for example, be used so as to have a molar ratio of about 0.95 gallium per three hydroxamic acids, i.e., slightly more than the stoichiometrically equivalent amount of hydroxamic acid, in order to have high extraction of the gallium. Of course, greater excesses of the hydroxamic can be used, but possibly with little added benefit. The described procedure then results in loading the extractant to circa 95% of capacity, and the gallium extraction is complete enough to allow disposal of the aqueous raffinate to allow impurity and salt disposal, and to maintain water balance. The organic to aqueous phases can vary widely, as 20:1 to 1:20 on a volume basis, but may often be close to 1:1, or a ratio which will provide the desired ratio of hydroxamic acid to gallium with the gallium and hydroxamic acid concentration which are present.

Following the loading, a crowding procedure is optional. In this procedure, additional gallium is provided, sufficient theoretically to load the extractant to greater than 100%, say 105%. This can be done by adding a small amount of fresh aqueous gallium feed solution to the separated, loaded organic phase, providing an amount of gallium such as to exceed a molar ratio of 1 gallium for each 3 hydroxamic acids. The small amount of aqueous solution results in a high organic to aqueous ratio. The equilibrium pH is generally adjusted to a relatively low value in this procedure, say 2–3, by addition of aqueous ammonia or sodium hydroxide. The object is to load the extractant to capacity, but not to precipitate any gallium hydroxide by high hydroxide content. With the gallium in excess, and the extractant forming very strong gallium complexes, the excess gallium and high organic to aqueous content will crowd off impurity metals which may be on the extractant from the relatively high pH used in the loading operation. The phases are generally blended by stirring for a short time, say once about 20 minutes, at a mildly elevated temperature such as those used for extraction, say about 50 to about 60° C., at a relatively low pH of 2–3, and the phases are then allowed to separate and the aqueous phase is removed. The small amount of aqueous phase can be saved for further use, as it still contains some gallium, and can be combined with feed for a subsequent run. The crowding operation effectively removes many metal ion contaminants, including copper, iron, nickel, zinc, iridium, vanadium, etc. Good phase separation is obtainable and is important to any solvent extraction method. Phase separation rates in extractions can vary widely so as to result in separation times from seconds to hours, depending upon major and minor components, extraction chemistry and temperature. Increasing temperature generally improves separation rates and it is generally advantageous to use temperatures of 40° C. or above for the separation. Under the conditions and with the agents generally employed in the present process, the phase disengagement times are not expected to exceed 30 minutes, and are usually much shorter than that. Additional crowding steps can be employed in series to result in further purification, if desired.

After the gallium is selectively loaded on the hydroxamic acid extractant, it can be further purified by scrubbing with an aqueous solution. This can be done immediately, or after the optional crowding step described above. It is advantageous to use ammonia or amine scrubbing solutions, as ammonia and amines are capable of complexing a large number of metal impurities. An ammonia scrubbing can conveniently be done with either aqueous concentrated ammonia or aqueous concentrated ammonium/ammonia buffer. The solutions are used to remove copper and other metals which form strong complexes with ammonia. The extremely stable gallium hydroxamate complex and the low affinity of gallium for ammonia or amines prevents gallium from being stripped by the ammonia scrub solutions. The strength of the aqueous ammonia solutions can vary widely, but it is preferred to use a concentrated solution, such as 10 molar, and to use approximately 1 to 5 volume amounts of the ammonia solution and the gallium-loaded organic solution. The organic and aqueous ammonia solutions are blended for a short time by stirring, say 2 to 30 minutes, and the phases are then separated. Sufficient time is allowed for complete phase disengagement. Long contact times between ammonia and the extractant are preferably avoided, since ammonia slowly converts some of the extractant into the amide via transamination Long contact times are not expected to be necessary in plant operations, so this should not be a problem.

Using an ammonium/ammonia buffer instead of just ammonia provides a way to utilize free concentrated ammonia but without having high pH. This has the advantage of not favoring gallium hydroxide formation and some consequent gallium stripping, although such losses are generally minor since the hydroxide concentration in aqueous ammonia is not very high (about 0.016M). Another and apparently more important advantage is that the free ammonia concentration is lower in the buffered system, thereby lessening possible reaction of the extractant from long contact with concentrated ammonia. Additionally, the highly ionic nature of the buffer solution should aid phase disengagement, although phase disengagement with just ammonia does not ordinarily appear to be a problem. Another advantage is that the lower pH reduces the amount of extractant hydrolysis and tends to improve extractant life. The ammonium ion is itself an effective agent for stripping copper and other soft metal impurities and can be used by itself for this purpose. However, the ion is not as good as free ammonia, and therefore an ammonium/ammonia buffer scrub solution is preferred. A number of anions can be utilized as counter ions to the ammonium ion, so long as the desired buffering is obtained, along with an immiscible aqueous phase, and insoluble or poorly soluble gallium salts are not formed. Various amounts of weak acids may be suitable, and the acetate ion can conveniently be employed, as an electronic grade glacial acetic acid of fairly high purity is available.

In theory, chelating alkyl amines or pyridines or polyamines, such as ethylene diamine, or diethylene triamine, are expected to be even more effective than aqueous ammonia in scrubbing soft metal impurities. It is expected that a concentrated ammonia solution can be replaced with a weak amine solution, say a 0.1% ethylenediamine solution buffered at pH 8.6 or possibly pH 8.0. Lower pH's could be used with adjustment upward of the amine concentration. the use of amine at a pH of about 8.6 has a number of potential advantages. Very little amine is required so that the scrub solution is essentially water and can be discarded after use. The amine will be cationic (H-ethylene diamine+) and will not dissolve in the hydroxamic acid phase. The amine does not have affinity for gallium, so many scrubs can be used to obtain high purity gallium without gallium loss. Stronger complexes are formed with some of the weaker-bonding metals, such as lead and cadmium, so that these metals are more effectively removed. Copper is expected to be effectively removed, even though it forms hydroxamate complexes of appreciable stability. Lower pH values can be used, which lessens the potential for extractant degradation. Also, faster phase separation should be obtainable due to the low concentration of amine, lower pH and cationic nature of the amine. With the amines, ammonium acetate can be used as a clean buffer system and to provide salt to aid phase separation. Branched amines, such as triethylamine, can be employed for scrubbing, and may be advantageous for use at high pH, as the transamination reaction with hydroxamic acid is not possible. Monopyridines are another example of a useful class of such amines. Chelating pyrines, such as orthophenanthrolene will work, but some gallium will be lost with no additional benefits to purity.

After an amine scrub treatment, the loaded organic phase can optionally be washed with water. However, if carboxylic acid impurity level (from hydroxamic acid degradation) has not been kept at a low level, phase separation will be a problem and it is better to omit the water wash.

A washing with dilute acid is effective in removing some metal impurities from the gallium-loaded extractant. This can usefully be done immediately after the gallium is loaded onto the organic extractant, or after crowding and ammonia or amine scrubbing operations. The washing is accomplished by blending the gallium-loaded organic phase with dilute aqueous acid, preferably sulfuric acid, so that the equilibrium pH of the acid is only about 1 and, preferably, about 2. Good mixing, equilibration and phase separation are important as this operation is for high purification, generally, at a stage after other purification procedures. The hydroxamic acid extractant in the organic phase will preferably be at least about 20% by weight and more preferably about 30% or more, in order to prevent stripping of the gallium by the dilute acid. This should be handled as a high purity operation with appropriate care as to purity and handling of components and equipment. More than one washing can be used, and normally about three washings may be used.

Once the washing purification steps have been completed, i.e., the crowding, scrubbing and washing procedures, the gallium is highly pure. The purified gallium is easily stripped from the organic, using only sufficient volume of pure acid to obtain acceptable gallium recovery. The organic to aqueous ratio preferably used is that which yields the highest percent gallium recovery but without more acid than is needed for this purpose as the acid generally contains some low level impurities, as is the case with electronic grade sulfuric acid, which may be used at, for example, 20-30% weight concentration. The blending time will ordinarily be sufficient to obtain, or at least approach, the maximum gallium recovery for the conditions, with 10 minutes or so being sufficient, but 30 minutes often being used. The temperature of the stripping is not particularly critical, although the lower the temperature, the better the separation of gallium from iron. The stripping may also discriminate over molybdenum and vanadium, and have some effect in separation of gallium from other metals, although the washing steps are more significant in the purification with respect to most metals. Since iron (III) has hydroxamic acid isotherms close to those of gallium, it is less readily separated from gallium hydroxamates by various washing procedures. However, with extra care and repetition of procedures, iron can be separated fairly effectively by extraction, scrubbing, washing and stripping procedures. Moreover, iron is separated effectively by various preliminary procedures which can be employed, involving reduction to iron (II), and/or precipitation, and in addition, iron can be separated effectively in electrowinning procedures used to convert the gallium product to the free metal form.

The process of the present invention can use one or more washing procedures for purification purposes. In a broad sense, washing involves mixing and blending a gallium-hydroxamic acid complex-containing phase with an immiscible phase and separating the phases, with the purpose of removing impurities. It includes simple washing of an organic hydroxamic phase with water to remove entrainments, or with aqueous phases containing ammonia or other scrubbing agents, or with aqueous solutions containing excess gallium to crowd other metals off of the hydroxamic acid complexes. The hydroxamic acids, particularly the N-alkylhydroxamic acids, have a high specificity for gallium with respect to other metals, which can be expressed in terms of selectivity coefficients. The selectivity coefficients, which are extremely high with respect to most other metals, can be taken advantage of several times during one purification cycle, so that the total selectivity for gallium is the product of the number of times that phase separation occurs in the cycle. For practical purposes, this removes any practical limitation on the ultimate purity of gallium produced by the method, so that the limitation depends on such things as the purity of reagents, handling procedures and cleanliness of containers.

The present purification process is very flexible in that steps can be varied or omitted, depending upon the identity and amount of the impurities involved, and the degree of purity sought. It is important to note that the various individual washing steps are in themselves part of the invention and can be used separately. Thus, the removal of amounts of certain metal impurities from a gallium hydroxamic acid complex by an aqueous wash, is useful, aside from whether other or additional amounts of impurities can be removed by additional procedures. The described crowding procedures are very effective for removal of a number of metal impurities. The use of scrubbing procedures utilizing ammonia or amines is particularly effective for removing metals which are strongly complexed by ammonia or amines and is useful for such purpose as an individual procedure. In some cases, with respect to a number of metals, the scrubbing procedure may be so effective as to make it desirable to dispense with one or more of the other washing steps. A simple washing step with water may be advantageous for removal of some amounts of metal impurities, removal of previous treatment agents, and because it is inexpensive, and does not result in addition of any extraneous agents or significant impurities. If significant amounts of carboxylic acids, or other hydroxamic acid degradation degradation products are present, phase separation rate may be a problem, making it advisable to dispense with water washing as a procedure.

Washing with dilute acid is effective for removing some metal impurities without much loss of the complexed gallium. It is a useful procedure, either alone, or in conjunction with the other washing procedures described herein. Several acid washes may be used in series, if desired, to attain the desired level of purity with respect to particular impurities.

The present process is flexible in the sense of being adaptable to use a minimum of procedures for removal of particular targeted impurities. However, it is also flexible in the sense of being useful by employing a number of different steps in a sequence as a standard procedure suitable for removing a variety of metal impurities from sources which may vary widely in the identity and quantity of impurities, without need to separate the source materials in accord with types of impurities. In using a general extraction process with several washing steps, usually one of the most useful and effective steps is the scrubbing step with ammonia or amines, so it will ordinarily be preferred to use that as one of the steps. An acid washing step is also usually effective and will usually be employed in a solvent extraction purification process.

The gallium salt product solution obtained by stripping can be used to prepare a solution for feed to an electrowinning process. For an acidic gallium sulfate product solution, two procedures have been found effective. Gallium hydroxide can be precipitated using electronic grade ammonia, followed by isolation and re-dissolution in electronic grade aqueous potassium hydroxide. Or the gallium sulfate solution can be added directly to excess aqueous potassium hydroxide.

In the direct addition process, the acidic gallium sulfate can be poured into KOH solution at a ratio such that the KOH is always in excess and no permanent precipitation of gallium hydroxide occurs. Once the solution cools, potassium sulfate crystals separate out and are easily removed by decantation or filtration. Most of the impurities in the electronic grade KOH and sulfuric acid remain in solution although copper at low (about 100 parts per billion) levels in the product gallium metal may come from this source. Since copper is generally the only impurity traceable to reagents used, it would probably be worthwhile to remove it from the KOH by electrochemical reduction prior to use for potassium gallate preparation. Copper at this low level can also be removed by electrochemical purification of the gallium, thereby making pre-removal optional.

For the ammonia precipitation procedure, the pH of an acidic potassium gallate solution is adjusted by ammonia addition to cause precipitation of gallium hydroxide, as by addition of sufficient concentrated aqueous ammonium hydroxide to pH of about 3.5 to 4, with stirring and addition of deionized water to reduce exothermic boiling. The gallium hydroxide precipitates quantitatively and settles fairly well, as a nicely flowable precipitate which can be transferred into centrifuge bottles. Centrifuging can be carried out well at 6000 rpm for 10 minutes. The precipitate can be collected by decanting the supernatant, adding more slurry and re-centrifuging. The slurry can be taken up in a minimum amount of 45% aqueous KOH, and an equal volume of deionized water can be added to solubilize all of the potassium gallate. The mixture can be stirred mechanically. Plastic stirrers and highly clean plastic, e.g., high density polyethylene (PE), tanks should be used for the mixing operations. The product potassium gallate solution should be clear and colorless, and may typically contain about 40 grams/liter gallium. Much higher gallium levels probably result in supersaturation, depending, of course, upon the excess KOH concentration used.

The pH extraction isotherms for hydroxamic acid extraction of gallium and iron (III) occur at relatively low pH ranges, and overlap somewhat, even though the curves are fairly steep from 0% to 100% extraction, while the isotherms for a number of other fairly common metals occur at somewhat or much higher pH and do not overlap with that of gallium. Thus, copper is extracted at a pH somewhat higher than the gallium isotherm, and aluminum, nickel, iron (II), zinc, magnesium, tin (II), silver and calcium exhibit steep isotherms over a broad range of still higher pH's. In view of this, the removal of iron (III) impurities from gallium may merit more attention than removal of other impurities. Thus, the pH can be controlled within narrow limits as needed to favor extraction or stripping of gallium, as the case may be, over that of iron. Also in extraction, the time for blending phases may be kept short, say only six minutes, to limit the time iron has to react and obtain some separation due to faster kinetics of the gallium complexing. Also, sulfuric acid can be selected as the stripping agent, as it is a good stripping agent for gallium with some selectivity over iron. The separation from iron (III) impurities can also be accomplished very effectively by electrowinning, as gallium is reduced to metal which drops out of solution, while the iron (III) is only reduced to iron (II) and stays in solution. A gallium concentrate can also be leached with caustic, thereby dissolving the gallium and none of the iron (III). Caustic can also be used to strip gallium from an organic hydroxamic acid extractant; this strips gallium as it can form the extremely stable $Ga(OH)_4^-$ complex, while iron (III) does not form the complex and does not strip. It is also possible to avoid extraction of the iron (III) by converting it into iron (II) in the feed by chemical or electrochemical reduction, prior to extraction with hydroxamic acid. By use of one or more of the described procedures, the gallium may be easily purified with respect to iron content.

Gallium from various sources can be converted into aqueous feed suitable for solvent extraction purification. Gallium concentrates can, for example be:
1. Gallium hydroxide concentrates produced from phosphorus furnace treater dust, zinc processing, alumina processing, etc.
2. Gallium from clean optical or electronic semiconductor material such as gallium arsenide, aluminum gallium arsenide or gallium phosphide fragments, such as deformed ingots, end pieces, broken wafers, etc.
3. Gallium from the low grade secondary sources such as lap sludge produced during the polishing of GaAs using a polishing compound, such as alumina, and often containing cutting fluid, making the material a slurry with usually only a few percent gallium content;
4. Metallic gallium from liquid or vapor phase EPI reactors or from thermally decomposed gallium arsenide.

The purer and high percentage gallium sources have significant value in themselves but will have enhanced value when further purified as taught herein. It is a significant advantage of the present process that it is also applicable to poorer grade gallium sources which may have little value or actually be considered wastes, and that significant value can be added to the low grade materials which cannot be processed suitably by currently commercial purification technologies.

Gallium hydroxide is the simplest feed material. The cake should not be dried when it is produced and should be sealed for shipment in plastic containers to prevent undue drying out. Freshly precipitated gallium hydroxide collected by filtration is about 70% water, the balance being gallium hydroxide in reactive form. The wet cake dissolves readily in either acid or base and the clarified product solution is direct feed for the SX circuit. For example, if the wet cake is white or, more likely, a light rust color, then it is dissolved by adding to it the minimum amount of concentrated sulfuric acid. The cake dissolves rapidly with some heat evolution which probably helps dissolution and is no problem. If very large amounts of iron are present, hydroxylamine or other suitable reducing agent can be added or electrochemical reduction can be used and the solution heated to near 100° C. to reduce all of the iron (III) to green iron (II). This solution should be left strongly acidic until the extractant loading step to prevent re-oxidation of iron and iron (III) hydroxide formation. Ferric hydroxide precipitation scavenges gallium and could result in some gallium losses. The sulfuric acid solution is then analyzed for gallium. The acid and gallium concentrations are not crucial as they are compensated for by the flexibility of the process. The gallium concentration should be known so that the amount of feed needed to match the amount of available extractant can be calculated. If large amounts of iron (III) are present and it is undesirable to reduce it to iron (II) then it can be used directly as feed. The difference will be that some iron (III) will be taken up by the extractant and later have to be separated from the gallium during stripping. Further gallium/iron separation can be accomplished by repeating the process; however, this is never necessary since iron is easily separated from gallium during the electrowinning step.

Alternatively, a very iron-free gallium feed solution is obtained by leaching the wet cake with an alkaline solution instead of dissolving it up in acid. Either aqueous ammonia or caustic may be used with caustic being preferred. The key to this iron (III)/gallium separation is that gallium forms the soluble gallate ion, $Ga(OH)_4^-$, in alkaline medium while iron (III) does not. Care is needed to insure maximum leaching of the gallium from the iron since iron hydroxide i an excellent scavenger for other metal ions including gallium. At least 85% of the gallium should be leached iron-free by 25% sodium hydroxide. The leachate is clarified by filtration or centrifugation.

Gallium arsenide pieces are difficult to process by known procedures utilizing such reagents as aqua regia or high temperature thermal processes. However, it has been found that GaAs dissolves rapidly and quantitatively in a combination of agents exemplified by a mixture of aqueous hydrogen peroxide and N-alkyl hydroxamic acid extractant used either neat, or dissolved in a diluent such as kerosene, as described in the aforesaid copending application Ser. No. 937,849. The gallium and the arsenic are separated simultaneously with the dissolution. With use of a water insoluble N-alkyl hydroxamic acid, the arsenic reports to the aqueous phase, and the gallium to the organic phase as the tris (N-alkyl alkanohydroxamate) gallium (III) complex. The gallium loaded organic is directly useable for purification by washing as described herein.

Gallium arsenide lap sludge can be dissolved utilizing the chemistry described above. The selective and approximately stoichiometric nature of the dissolution allow it to be applied to heterogeneous solid mixtures such as lap sludge or saw kerf. In contrast to agents such as aqua regia, a hydroxamic acid and hydrogen peroxide treatment leaves alumina solids practically untouched, so that the reagents are not wasted and the alumina can probably be recovered for re-use. An organic gallium complex-containing phase is obtained which is suitable for washing for purification as described herein.

Crude gallium metal is difficult to dissolve in chemical reagents, even aqua regia. However, it has been found that it is readily dissolved if used as an anode in an electrochemical system and that use of a very low overpotential solution prevents reformation at the cathode, with an aqueous acid, e.g., a sulfuric acid solution, say 25% or so by weight, working very well. Copious amounts of hydrogen evolve at the cathode and need to be vented. The solution can be taken to saturation in gallium bisulfate in, for example, about 24 hours. The warm product electrolyte can be diluted by addition of 50% to 100% by volume water to prevent solidification upon cooling, and used directly as feed in a purification unit for loading the gallium on a hydroxamic acid.

The washing operations of the present invention employ a hydroxamic acid extraction compound loaded with gallium, and the loaded compound can be obtained in various ways, and particularly by the extraction procedures described in the aforesaid Ser. No. 937,849.

Hydroxamic acids have been shown to extract gallium (III) from aqueous solution rapidly in the pH range from about 0.5 to about 12 and to be rapidly stripped of gallium (III) by aqueous solutions with a pH outside this range. This range of pH for gallium (III) extraction coupled with two pH ranges for gallium (III) stripping, namely less than about 0.5 or greater than about 11 or 12, allows the use of hydroxamic acids in a process for gallium (III) extraction from either acidic or alkaline leach solutions, and both can be used for preparing gallium-loaded compounds. Actually, there is generally some overlap in extraction and stripping conditions, and stripping can be accomplished, for example at pH's of about 11 or 11.5 or above. However, efficiencies are affected, as an extraction, for example, will have low efficiency under conditions where a large proportion of the Ga is partitioned into the aqueous phase.

In addition to the above hydroxamic acid compounds the organic phase of the extractant ordinarily comprises a liquid, usually hydrocarbon solvent. Such solvent must be substantially water immiscible so as to be separable from the aqueous solutions originally containing the gallium values. Suitable solvents include aliphatic and aromatic hydrocarbons such as kerosene, hexane, toluene, methylene chloride, chloroform, carbon tetrachloride, xylene, naphtha, cyclohexane, Chevron Ion Exchange solvent, Kermac 470-B, Solvesso 100 and the like. Kerosene and other distillates are preferred. Generally, the hydroxamic acid compounds will be present in the organic phase in an amount of at least about 2% by weight. Preferably, an N-alkyl alkanohydroxamic compound will be present in the amount of 2 to 40%, more preferably about 10 to 35%, by weight, based on the total organic phase. Viscosity and/or solubility serves to fix the upper limit of the content of said hydroxamic acid compound which will depend upon the structure of the compound employed. Normally, an amount of above about 20% by weight is employed although amounts as high as 60% can be functional. Certain structures, for example, N-methyl isostearohydroxamic acid N-methyl-nonano hydroxamic acid, have sufficiently low viscosity that they an be used neat, i.e., without a solvent. Where high complexing salt concentrations are present as in phosphate rock treater dust leachate, the extractant efficiency drops off at extractant concentrations less than 10%; while efficient extraction is obtained at even 2 to 5% concentration in the absence of other complexing salts. With N-alkyl naphtheno hydroxamic acids, 20%–30% or so is preferred as higher concentrations tend to have high viscosity.

The organic phase may also contain modifiers which can be a long chain aliphatic alcohol, such as isodecanol or phosphate esters, such as tributylphosphate. Modifiers serve to prevent third phase formation, aid in phase disengagement and/or increase extractant solubility in the hydrocarbon solvent. If a modifier is used, it can be used in amounts of about 0.5% to 50%, or greater, by volume of the hydrocarbon solvent, preferably about 5%. Certain particular types of modifiers, referred to herein as co-extractants, serve to improve the efficiency or speed of the extractions, as further described herein.

In carrying out the extraction, the gallium bearing aqueous solution is contacted batchwise or continuously with the extractant solvent comprising at least 2% by weight of the N-organo-hydroxamic acid. The aqueous feed solution bearing gallium can be adjusted to provide an equilibrium pH in an appropriate range depending upon the particular hydroxamic acid extractant employed and upon the type of leach solution being extracted, as described herein. The volume ratio of the aqueous phase to the organic phase should be selected to most effectively remove the gallium from the aqueous phase without requiring undue volumes of materials. Aqueous phase to organic phase volume ratios of from 1:20 to 20:1 are believed to be effective, although other ratios may prove effective depending upon the specific characteristics of the solvent extractant, the gallium bearing aqueous solution and equipment employed. Phase contact can be achieved using, for example, mixer-settlers. In the mixer, one phase is dispersed within the other by stirring or some other suitable means of agitation. The extractant forms a complex with the gallium within the organic phase of the two-phase liquid mixture. The dispersion then flows to the settler where phase disengagement occurs under quiescent conditions. Generally, extraction can be carried out at temperatures in the range of 0° C. to 90° C. or more, preferably in the range of about 35° C. to about 70° C. Most preferred is about 50° to about 60° C.

The extractions to obtain a gallium-loaded extractant frequently extract the gallium from aqueous mineral acid solutions of gallium with adjustment of pH to desired values, but still on the acid side. However, it is also possible to carry out the extractions under alkaline conditions, and this may be more economical with some source materials in which gallium is present as an impurity in alkaline solutions, e.g., Bayer process liquors from an alumina treatment process. Efficient extraction can be obtained under alkaline conditions ranging from pH 7 to about 11, and the upper end of this range can be extended further by use of coordination solvents in the organic phase or particular conditions, or by use of recycling or recovery procedures to compensate for extraction inefficiency. Conversely, higher alkaline aqueous solutions, such as those of pH 11 to 12 or higher, particularly at about 11.5 to 12 or 20, can be used for stripping gallium from hydroxamic acid extractants.

After washing procedures, the gallium values can be stripped from the loaded organic phase without decomposing the hydroxamic acid by contacting one part by volume of it with about 0.05-10 parts by volume, preferably about 0.2-2.0 parts by volume, of an aqueous solution at 0°-80° C., preferably about 15° C.-60° C. The aqueous solution used for stripping the loaded organic phase can be a solution of a mineral acid, caustic or ammonia. Suitable mineral acids include sulfuric, hydrochloric, hydrofluoric, nitric and the like. The preferred mineral acid solution is sulfuric acid containing about 10-400 grams of sulfuric acid per kg. solution, preferably about 100-300 grams per kg. solution. In percentages, this is 1 to 40% sulfuric acid, and preferably 10 to 30%. Suitable aqueous ammonia solutions are solutions containing 50-300 grams ammonia per kilogram of solution, preferably about 100-200 grams per kilogram of solution. Suitable caustic solutions are 5-400 grams NaOH, preferably about 5-80 grams NaOH, per kilogram of solution or 5-500 grams per kilogram solution of KOH, preferably about 5-100 grams per kilogram solution. Phase contact with the stripping solution can be achieved with mixer-settlers, or other suitable devices. In this manner, the gallium is recovered from the organic phase into the stripping solution as a gallium salt. The gallium-bearing stripping solution can be treated by conventional means to recover gallium metal, for example, by electrolytic reduction of an aqueous caustic solution of the gallium.

The class of extractants used herein are hydroxamic acids which are soluble in hydrocarbon solvents and substantially insoluble in water. Such hydroxamic acids are of the formula $R_1C(O)N(OH)R_2$ in which $R_1$ and $R_2$ are organo groups, or either $R_1$ or $R_2$ is hydrogen, and have a total of at least about 8 carbon atoms and preferably not more than about 40 carbon atoms. $R_1$ and $R_2$ are preferably alkyl groups as in N-alkylalkanohydroxamic acids, but can contain aromatic, halogen or other groups, provided that the compounds are water insoluble and the groups do not unduly interfere with functionality as extractants for gallium Exemplifications of $R_1$ and $R_2$ include linear, branched or cycloaliphatic groups although in the case of such cycloalkyl groups as cyclohexyl, care must be taken to have sufficient hydrophobic groups present to provide the desired water insolubility. The hydroxamic acids and their gallium complexes must have appropriate solubility in organic media. The extractants used herein also have high solubility in kerosene and other substantially aliphatic petroleum distillates. $R_2$ frequently represents lower alkyl, particularly of 1 to 3 carbon atoms, or the methyl group. $R_1$ can also have additional N-organohydroxamic acid groups, as in structures wherein $R_1$ represents $R_3CH((CH(R_4))_pC(O)N(OH)R_5)$—S, where p can range from 1 to 5, preferably 1. Such a compound is exemplified by di-hydroxamic acids of succinyl compounds; in such compounds at least one of $R_3$ and $R_4$ is an organo radical and the other one be hydrogen, and $R_5$ is an organo radical, and the $R_3$, $R_4$ and $R_5$ organo radicals often have a total carbon number greater than 8 and are preferably alkyl radicals selected from the types of groups described above or illustrated or exemplified herein with regard to $R_1$ and $R_2$. For gallium (III) extraction these dihydroxamic acids are best used in conjunction with a monohydroxamic acids. The synergistic blend extracts gallium from more acidic or basic media than do monohydroxamic acids when used alone. As will be further described herein, this is a useful property. A particular class of useful N-organo-hydroxamic acids is represented by the formula $CH_3(CH_2)_mC(O)N(OH)(CH_2)_nCH_3$ wherein m is an integer from 6 to 16 and n is an integer from 0 to 6. N-organohydroxamic acids with $R_1$ being a branched alkyl group another than neo alkyl containing 8-17 carbon atoms and $R_2$ being methyl are the most preferred.

It has been discovered that the class of N-organohydroxamic acids, particularly exemplified by N-alkylalkanohydroxamic acids, which are chelating extractants, reversibly extract gallium (III) over a broad range of pH conditions. It happens that gallium (III) exists in aqueous solution in a number of different hydroxide complexes whose relative abundance depends upon pH. The Ga salt is the predominant form below pH 2, but its proportion rapidly declines between pH 2 and pH 4, while the fraction of $Ga(OH)^{2+}$ rises to about 50% at pH 3 and then declines to near zero at pH 5; the $Ga(OH)_{2+}$ species becomes evident above pH 2, rising to about 65% at pH 4 and then declines to pH 6; $Ga(OH)_3$ becomes evident at pH 3, rising to nearly 60% at a little above pH 5 and then declining to near zero at pH 7; $Ga(OH)_4$ appears at about pH 4 and becomes the predominant form over pH 7. Since the tri-hydroxy species $Ga(OH)_3$ is virtually insoluble in water, and is formed in the pH range from about 3 to about 7, a natural limitation is therefore placed on the pH of commercial gallium-containing solutions which do not utilize solubilizing chelating agents. Gallium might thus be obtained in a solution with pH less than about 3 via acid leaching with acids such as HCl or $H_2SO_4$, or with a pH greater than about 7 via alkaline leaching with alkalies such as sodium hydroxide, lime or aqueous ammonia.

It is desirable that the extractant for metals have low solubility in water in order to avoid loss of extractant in aqueous media. In Table 1, the aqueous solubilities of a number of hydroxamic acids are reported.

TABLE 1

AQUEOUS SOLUBILITIES OF N-ALKYLALKANO AND N-H HYDROXAMIC ACIDS

| EXTRACTANT | SOLUBILITY (25° C.) | |
|---|---|---|
| | ppm | molarity |
| versatohydroxamic acid (not N-alkyl) | 1600. | $8.54 \times 10^{-3}$ |
| neotridecanohydroxamic acid (not N-alkyl) | 328. | $1.43 \times 10^{-3}$ |
| N-methyldecanohydroxamic acid | 111./82. | $5.48 \times 10^{-4}$ |
| N-methylhexadecanohydroxamic acid | $1.3 \pm 1$ | $4.60 \times 10^{-6}$ |
| N-isopropyldecanohydroxamic acid | $3.9 \pm 1$ | $1.68 \times 10^{-5}$ |
| N-hexyldecanohydroxamic acid | $1.6 \pm 1$ | $5.71 \times 10^{-6}$ |
| N-(1-nonyldecyl)cyclohexanohydroxamic acid | $0.7 \pm 1$ | $1.7 \times 10^{-6}$ |
| N-methylnonanohydroxamic acid | 409 | $2.18 \times 10^{-3}$ |

It will be noted that most of the N-alkyl hydroxamic acids have very low solubilities in aqueous media, with the solubility tending to increase with decreasing number of carbon atoms in the hydroxamic acids. The N-methyl nonanohydroxamic acid has relatively high aqueous solubility; however, its solubility in a typical phosphate rock treater dust leachate (containing high concentrations of Al, Zn, Fe, phosphate and other ions) is markedly lower, being 20 ppm ($1.07 \times 10^{-4}$ molarity). This appreciable but limited solubility appears responsible for the effectiveness of N-methylnonanohydroxamic acid in extracting Ga from such leachates, with regard to both the rate and extent of the extraction compared to higher carbon number N-alkyl hydroxamic acids. For the extraction to occur, it is necessary that the extractant have some slight solubility in the aqueous Ga-containing medium.

With some of the higher molecular weight N-alkyl hydroxamic acids, a modifier is useful for augmenting solubility in such media as treater dust leachates, and in improving effectiveness of extraction from such media.

In general the N-alkylhydroxamic acids are more readily soluble in kerosene and similar aliphatic hydrocarbon solvents than the N-H hydroxamic acids. In addition, the N-alkyl hydroxamic acids in general give less viscous organic solutions than corresponding N-H hydroxamic acids, and are therefore easier to work with and less likely to cause mechanical problems if utilized in large scale commercial applications.

Very limited water solubility is a characteristic of the N-organo hydroxamic acid extractants used herein. An efficient extraction requires that the extractant be much more soluble in an organic medium than in aqueous media. In addition, if the extractant has relatively high water solubility, there will be much loss of extractant in the aqueous phase raffinate. However, the extractant is being employed to extract metal ions from aqueous media, so it is essential that the extractants have some limited solubility in such media. It is generally desirable that the extractant solubility in the aqueous metal-containing phase not exceed 300 ppm. When very dilute aqueous solutions are involved, the solubility of the extractant in the solution may be similar to that in water itself. However, in the case of solutions of minerals, such as acid solutions from leachates of phosphate rock treater dust which contain fairly high concentrations of metal salts, the solubility of the extractant may be much lower in such solutions than in water. There is a salting out effect from the metal salts. In such cases the desirable solubility is to be considered with respect to the metal-containing solution from which the metal ions are to be extracted. Thus, the extractant will desirably have less than 300 ppm solubility in the aqueous medium from which metals are to be extracted. Or in the case of washing operations, less than 300 ppm solubility in the aqueous washing solution employed. In order to improve the solubility of the extractant in metal-containing media, N-alkyl hydroxamic acids can be selected which have a carbon atom number toward the lower end of an eight to 20 carbon atom range. Even so, such extractants will have little solubility in water, generally less than 0.1%. Also it is possible to improve the extractant effectiveness by using certain co-extractant modifiers. Such modifiers include alkylphenols, such as one with 6 to 16 or so carbon atoms in the alkyl group. Other useful co-extractant modifiers include lower molecular weight N-alkylhydroxamic acids, such as N-alkyl alkanohydroxamic acids containing no more than 11 carbon atoms. Such co-extractants may aid in transporting gallium ions in the aqueous medium to the interface for complexing by the hydroxamic acid extractants present there.

While it is desirable to employ extractants with some limited solubility in the aqueous media being treated, it is also necessary to have agents with high solubility in the organic medium used, which is preferably an aliphatic hydrocarbon, and to have a sufficiently high number of carbon atoms to assure such high solubility. It is further desirable that the extractant have a high solubility ratio with respect to relative solubility in the organic medium compared to the aqueous medium, as expressed by partition ratios in organic:aqueous of >10:1, and preferably >20:1 and often >100:1.

The use of modifiers which improve extraction efficiency may also provide other advantages. For example, for extraction under acid conditions some extractants may ordinarily require a pH at least as high as 1.2 for desired extraction rate and extent; but with an effective modifier, such desired results may be obtainable with the same extractant at pH's as low as 0.8 to 0.9. In general, an effective modifier may extend the suitable pH range to values 0.3 or 0.4 units lower. With no modifier present, a desirable pH range for removing Ga from acid solutions having fairly substantial salt concentrations, such as leachates from phosphate rock treatments, is in the pH range of about 1.2 to about 1.6 A pH of 1.2 or above permits substantially complete Ga removal in three or four contacts; while a pH of 1.6 or lower tends to avoid any substantial precipitation of the metal ions present in the solution. On the other hand, if pH conditions which cause precipitation are employed, the solutions are more difficult to handle and extra filtrations may be required, or the precipitatious may cause poor separation of some metals.

The present invention will be useful for purifying gallium from various sources of gallium arsenide, whether substantially pure gallium arsenide, gallium aluminum arsenide, gallium indium arsenide, or gallium arsenide contaminated with various metal or other impurities or dopants. Such possible sources include, for example, those described in the above-referenced Bird et al publication, being waste or scrap materials generated during gallium arsenide wafer manufacture and processing into semiconductor devices, and described as endcuts, broken wafers, saw kerf, lapping compound, etc., and the waste can contain Fe, Al, Si, Zn, and other metallic and non-metallic wastes listed in the publication. The invention can involve separation of gallium from other metals and further purification of gallium. In particular, water insoluble N-alkyl hydroxamic acids are selective extracting agents and the process can be adapted to effect separation of gallium from many metals, particularly by appropriate adjustment of pH; and wash solutions can be used to remove metal impurities from solutions containing gallium hydroxamate chelates. At relatively low pH, many of the metals are water soluble, while the gallium hydroxamic acid chelate is extracted into organic media. If desired the dissolution, extraction and washing procedures herein can be adapted to produce very high purity gallium. Also alternatively the gallium obtained in the present invention can be subjected to further chemical or physical treatments for further purification such as electrolytic deposition, vacuum-thermal deposition, recrystallization, chemical dissolution, extraction, filtration, including for example various procedures as disclosed in the above-referred to Production of High Purity Gallium from Scrap Gallium and Abrjutin et al U.S. Pat. No. 4,362,560.

Some sources of gallium arsenide contain only small amounts of gallium arsenide such as 1 or 2% by weight, and exemplary processes herein are especially useful for recovery from scrap material containing only small amounts of gallium arsenide.

It is definitely preferred in the present invention to use N-organohydroxamic acids because of various advantages such compounds have over N-H hydroxamic acids. Such advantages include greater hydrolytic stability, easier stripability of gallium and especially iron from the chelate, and greater solubility in aliphatic hydrocarbon solvents. Purifications with N-H hydroxamic acids can be carried out as described for N-organohydroxamic acids, recognizing that appropriate solvents should be selected with sufficient capability to dissolve the N-H hydroxamic acids, and that greater hydrolytic or other losses of the hydroxamic acid will in general occur with problems in recycling the hydroxamic acid.

Among the various N-organohydroxamic acids useful in the present invention are, for example, N-methyl-nonanohydroxamic acid, N-methyl-naphthenohydroxamic acid, N-methyl 2-hexyl-decanohydroxamic acid, N-methyl stearo-hydroxamic acid, N-methyl isostearohydroxamic acid, N-methyl neotridecanohydroxamic acid, N-isopropyl decanohydroxamic acid, N-hexyldecanohydroxamic acid, N-(1-nonyldecyl) cyclohexanohydroxamic acid, N-ethyl naphthenohydroxamic acid, N-methyl neodecanohydroxamic acid, N-phenyl naphthenohydroxamic acid, N-methyl 4-decylbenzoydroxamic acid, N-n-propyl naphthenohydroxamic acid, N,N'-dimethyl n-decylsuccinodihydroxamic acid. Efficiencies of the hydroxamic acid will vary somewhat, and the more water insoluble hydroxamic acids will separate more readily from aqueous reaction product. However, those hydroxamic acids which are slightly water soluble, or even considerably water soluble, can be separated from aqueous media by organic solvent extraction if necessary if they have some oil solubility, as will be the case, for example, for N-methyl pentanohydroxamic acid.

Various N-H hydroxamic acids are suitable for use herein and representative compounds may have a total of up to about 30 or so carbon atoms, with those of about 7 or more carbon atoms being water insoluble. Examples of suitable N-H hydroxamic acids include naphthenohydroxamic acid, nonanohydroxamic acid, decanohydroxamic acid, stearohydroxamic acid, neotridecanohydroxamic acid and modifications of the various N-organo hydroxamic acids disclosed herein, but with the N-alkyl or other N-organo group replaced by a hydrogen substituent, provided that the compound has no requisite number of carbon atoms. Similarly, in the representative formulae for hydroxamic acids disclosed herein, the N-organo substituent can be replaced by a hydrogen substituent, as in $R_1C(O)N(OH)R_2$ in which $R_2$ becomes hydrogen, and $R_1$ has at least about 8 carbon atoms for water insoluble hydroxamic acids.

The amines used for scrubbing herein are amines capable of complexing metals and also generally are water soluble. In general, amines, especially hydrocarbyl amines without interfering substituents, have the ability to complex metals, and by way of example various classes of amines are useful, such as alkyl amines, aryl amines, alkylene diamines, alkylene polyamines, polyamines, heterocyclic amines such as pyridine, primary, secondary and tertiary amines, etc., and polyamines having no more than 2 or 3 carbons between amine groups. Chelating amines are preferred. Many amines have high solubility in water, e.g., ethyl amine, ethylene diamine, pyridine, etc., and the use of highly soluble amines avoids extraction of the amines into the organic phase during scrubbing, but water soluble amines of lower solubility can be used if the solubility is not so poor as to make the extraction losses unacceptable. Amines with large hydrophobic groups, such as long alkyl chains, tend to be less water soluble. Carbonyl, halo, hydroxyl or other functional groups can be present in the amines, so long as they do not unduly interfere with the effectiveness of the amines. Of course, the amines should not have hydroxamic acid groups as such compounds are employed herein to complex gallium, and it is not intended to utilize other hydroxamic acid compounds to wash the gallium from the complexes. Thus, the amine scrubbing agents used herein do not include hydroxamic acids.

In addition to the washing solutions described and particularly exemplified herein, it may be desirable on occasion to use special wash solutions to target specific impurities, although such solutions are not ordinarily needed. For example, wash solutions with fluoride ions, mono or dibasic orthophosphate ion, oxalic acid, ethylene diamine tetracetate, reducing agents (such as hydroxylamine), etc., can be used, either alone, along with, before or after the other washing procedures described herein.

EXAMPLE 1

A phosphate treater dust leachate had been upgraded by solvent extraction employing N-alkylhydroxamic acid, but with early procedures which had not been optimized. The gallium hydroxide concentrate was of poor quality, i.e., low in gallium and high in impurities, especially difficult-to-process phosphate. The concentrate was treated and washed in accord with the present invention, and analysis was performed on the sulfuric acid strip solution obtained as product. The feed material and results are described in Table 2.

It will be noted that the gallium purity has been greatly enhanced, from about 25% to 97%. The percent of vanadium was also increased, going from 0.47% to 2.2%. This was an artifact of the particular procedures, as tighter control of conditions in subsequent procedures eliminated vanadium. Thus vanadium can be obtained as a co-product (of significant value), or eliminated. Another consideration is that gallium feed sources containing vanadium are rare, and vanadium can be easily separated from gallium during electrowinning. The gallium level in the purified solution was many times lower than in the feed material, and therefore the impurity levels in the two solutions are not directly comparable. However, the "percent of total metal" columns are directly comparable and illustrate good purification.

TABLE 2

Purification of Ga in Treater Dust Leachate

| Element | Before ppm | Before % total metal | After ppm | After % total metal |
|---|---|---|---|---|
| Ag | 14.6 | .003 | <1 | — |
| Al | 26,170. | 5.38 | <7 | — |
| Ba | 29. | .006 | <1 | — |
| Be | 13. | .003 | <1 | — |
| Ca | 3,580. | .74 | 2 | .1 |
| Cd | 1,130. | .23 | <1 | — |
| Cr | 1,050. | .22 | <1 | — |
| Cu | 98. | .02 | <1 | — |
| Fe | 63,190. | 13. | 3 | .2 |
| Sb | | | < | — |
| Mg | 897. | .18 | <1 | — |
| Na | 77,520. | 16. | 5 | .3 |
| Mo | | | <1 | — |
| P | 148,680. | 31. | 3 | — |
| Si | 57. | .012 | 2 | — |
| Ni | | | <1 | — |
| Sr | 167. | .034 | <1 | — |
| Ti | 108. | .022 | <1 | — |
| V | 2,290. | .47 | 38. | 2.2 |
| Pb | | | <1 | — |
| Zn | 36,710. | 7.54 | <1 | — |
| K | 1,720. | .35 | 2. | .1 |
| Ga | 122,600. | 25.2 | 1,670. | 97. |

EXAMPLE 2

Set up a 30 gal (113.55L) conical bottom polyethylene (PE) reactor with a bottom drain made out of polyvinylchloride (PVC). Temperature control was by a water jacket made by placing the above tank in a similar shaped 55 gal (208.18L) conical bottom PE tank. The only break in the wall of the inside tank was the bottom spigot. This design minimized solution hangup and the associated carryover contamination problems. Stirring was via a ⅛ hp. overhead stirrer where the 1" (2.54 cm) shaft and impeller were PVC coated. The reactor was fitted with an overhang lid containing two holes, one for the stirrer shaft and one for the addition of solutions during processing. The additional hole was plugged when not in use with a PE stopper. The hole for the stirrer was the minimum needed to fit the shaft through so that it was effectively plugged also. The reactor stood on a steel epoxy-coated stand which in turn sat on an aluminum table so that it could be drained by gravity. A ladder/cart provided the necessary height to allow the addition of solutions to the top of the reactor through the additional hole via a PE funnel. The funnel was kept in a closed PE bag between uses.

CHARGING

1. N-methyl nonanohydroxamic acid (NMP), 4.4 Kgs, was charged into the reactor followed by 66.24L of Kermac 470B kerosene.
2. Gallium sulfate feed material was prepared by electrolyzing Ga metal in 25% $H_2SO_4$ until a solution of 5.02 liters containing 486 g Ga was produced.
3. Purification processing was started by adding the above Ga solution to the reactor with the extractant. An additional 18.93L of deionized (DI) water was added to provide sufficient depth so that the stirrer impeller was near the liquid-liquid interface. This additional water was not necessary during subsequent runs when a longer stirrer shaft was provided.

LOADING

4. Added 1.43L of purified aqueous ammonia (about 27% by weight, Olin Hunt, Semiconductor grade) over a three minute period. Indications are a longer addition period (e.g. 10 min.) would be more desirable to avoid $Ga(OH)_3$ precipitation with slow re-dissolution. Blended phases for 30 min. at Tj=47° C. (Tj=jacket temperature). Let settle 60 min. then withdrew 0.946L sample which gave a pH of 0.5 and no $NH_3$ odor. Added 500 ml aqueous ammonia with phase blending. Let blend for 2½ hours at Tj=54.8° C. The pH was 0.5 and no $NH_3$ odor. Added 1000 ml more aqueous ammonia with phase blending. After 10 min. blending, then phase separation, pH=0.5 and no ammonia odor. Added 1000 ml more ammonia with blending. Blended 10 min. then had light $NH_3$ odor and pH 8.5 with Tj=56.7° C. A foam head had developed. Let settle two days at room temperature. 5. Organic phase essentially clear yellow. Restarted jacket warming which was at 21° C. Collected 0.946L of creamy bottom phase. pH=8.5 - 9.0. Strong $NH_3$ odor. Analyzed bottom phase for Ga, showing almost complete extraction therefrom %E(-Ga)=99.8%. Withdrew the remaining amount of creamy bottom phase, about 15L. This creamy solution eventually completely separated into two clear phases but separated extremely slowly (few days) and much slower than the water wash in step 6f below.

WASHING 6.a) Added 37.85L (DI) water then blended phases 10 min. Tj=37° C. Phases separated slowly. Bottom phase creamy even after 1 hr very slow stirring (to encourage coalescence). Tj=43° C.
6.b) When Tj reached 45° C. about 1.9L of the bottom white creamy phase was withdrawn. This sample had T=32° C. and pH=8. Returned this sample to the tank. Stirred one hour and resampled; Tj=50.0° C., T=41.7° C. in the tank. Repeated sampling after 2 hours more; Tj=54.8° C., T=39.0° C. After 90 min. more Tj=54.2° C. Five hours later; Tj=60.2° C., T=51.0° C. Reblended 1 hr.
6.c) The above efforts demonstrated the slow heat up of the system. A 170L open top cubic polyethylene tank was set up with circulation and heater so that the solutions could be prewarmed.

6.d) After standing 14 hours, Tj=60.9° C., T=52.0° C. Org phase was clear but bottom not visible. Bottom phase was creamy with some clear aqueous solution on bottom of it. Blended phase 20 min, T=55.5° C.

6.e) After 14 hours, the sample of part 6b of the bottom phase which had been held in a side bath at 57° C. had substantially separated to form a clear brownish layer 7.5–10 cm thick on top and on bottom. The top layer was 1950 ml with a density of 0.739/g/ml. Therefore this is just organic phase. HA analysis gave [HA]=0.211M. Therefore there is a lot of extractant in the creamy bottom phase (751.g total).

6.f) Withdrew 5 gal. of creamy white liquid from the bottom of the reactor. The step was to remove the RC00 —$NH_4+$ impurity in the system, which was present in the crude extractant, which is a surfactant and produces the emulsion which is the bottom phase. This creamy solution was placed in a recovery tank with spigot. It gradually separated into clear brown layers on top and bottom. It eventually (10 hours more) became completely clear with just two phases.

6.g) Added 18.93L preheated DI water to the reactor and blended phases 30 min. at 60% of full speed. After 2.5 hours sitting and Tj=60.8° C., organic was clearing on top and bottom layer was semiclear. After 10 hours Tj=60.7° C. and the organic phase appears to have separate though still a bit cloudy. Probably needs another wash. Withdrew 18.93L clear yellow aqueous layer then encountered creamy bottom phase. Blended another 30 min. at Tj=60.7° C. then let settle. Repeated water washings. The results of these washings are given in the following Table, along with information on the original gallium feed and the first raffinate separated.

TABLE 3

| SAMPLE | IDENTIFICATION | VOL. | PPM Ga |
|---|---|---|---|
| Raffinate | Clear aqueous phase which separated from creamy bottom of phase. | 6 L | 160 |
| Ga Feed Charged | Clear aqueous solution | 5.02 L | 96,800 |
| Wash #1 | Clear yellow | 18.93 L | 66.9 |
| Wash #2 | Clear yellow | 13.25 L | 56.0 |
| Wash #3 | Clear light yellow, $NH_3$ odor | 18.93 L | 35.0 |
| Wash #4[a] | Clear light yellow, $NH_3$ odor[b] | 37.85 L | 6.4 |

[a] Wash includes entrained organic phases from previous three washes.
[b] Added longer stir shaft and sight tube at this point.

Therefore washing with water does not result in any significant gallium losses.

Note that it was later surmised that the creamy phase in the above procedures was probably caused by the very small impeller blades on the stock stirrer which then had to be rotated at very high rpm's. (e.g. 60% of full power). This produced top speeds far exceeding that required to produce mechanically-caused microemulsions which are very slow to break. A larger (20 cm dia.) 4-prop PVC blade was made in-house and installed later to remedy this problem.

CROWDING

7. To the organic phase in the reactor was added 6.02L of 88,600 ppm of fresh acidic gallium sulfate solution which was first partially neutralized by 1000 ml concentrated $NH_3$ and diluted to 9.5L with DI water, pH=1.5. This solution needs to be kept warm to prevent gallium sulfate from crystallizing out.

8. Added 9.5L warm DI water and 5.7L of organic phase gathered from the above wash solutions. Added 113.6L more DI water to facilitate stirring with the short stirrer shaft. Tj=53.5° C. Also added 10.6L of 49,600 ppm Ga (as the bisulfate) in aqueous sulfuric acid.

9. Exchanged the stirrer for one with a 20.32 cm blade sweep diameter. This allows blending at much lower tip speeds. Blended phases one hour. Tj=60.8° C. Aqueous layer was crystal clear and colorless. Withdrew 34.07L of aqueous phase which was pH0.5 and 55° C. Aqueous phase had [Ga]=30,900ppm Ga. This aqueous solution was kept as feed for the next run.

POST-CROWDING WASH

10. Added 37.85L DI water to reactor and blended phases for 60 min. at low rpm. Tj=56.3° C. Let stand overnight.

11. Organic phase was clear. Took sample of Org. phase

12. Withdrew 37.85L of clear and colorless aqueous phase. [Ga]=0.698g/1 or 26.4g total Gallium. This wash solution was saved to be used to prepare gallium sulfate feed solutions.

13. Washed organic phase with 37.85L DI water at 55° C. Stir speed only about 120 rpm for complete blending indicating the much better performance of the longer blade length. Tj=53.8° C. T=53.5° C. Phases separated rapidly.

14. Withdrew 37.85L of aqueous phase. [Ga]=11.2ppm. Therefore insignificant gallium losses occur with additional washing. pH=4.0. Removed a small amount of solids at the interface with the washings.

15. Added 37.85L preheated DI water (55° C.). Washed 60 min. and let stand 3.67 hours. Aqueous phase was clear and colorless. Organic phase was crystal clear.

GALLIUM STRIPPING

16. Prepared 18.93L of 30% $H_2SO_4$ by adding 8.16 kg of electronic grade $H_2SO_4$ to 19.0L millipore deionized (MPDI) water. Preheated this solution to 55° C.

17. Added 3.79L of 30% $H_2SO_4$ from (16) at 55° C. and blended 30 min. The aqueous phase had a yellow color. The organic phase was washed twice with DI water to avoid undue contact of the extractant with acid.

18. The pH of the strip solution was adjusted to 9.5 using electronic grade aqueous ammonia. A pH of about 3.5–4 would give optimum gallium precipitation. Centrifuged the mixture (10,000 rpm for 10 min. using 6×250 ml portions at a time). The precipitate was dissolved in electronic grade 45% KOH. Overnight some white solid (probably KGa(OH)$_4$ representing ⅓ of the total volume settled out. Concentration of gallium in the supernatant was 65,400 ppm.

This example demonstrates an overall basic procedure for purifying gallium by solvent extraction.

EXAMPLE 3

Preparation of Organic Phase

An additional 7.32Kg of 85.42% NMP were added to the organic phase from Example 2. Total theoretical extractant loading is now 1322g of gallium.

Preparation of Impure Gallium Feed

Feed was prepared in the same manner as for Example 2 and had the composition of 953.4g Ga in 18.33 liters of aqueous solution.

Loading

These two phases were blended in the reactor at 50° C. at ca 90 rpm while 3.50L concentrated ammonia (27% by weight) was added. Phases were blended 60 minutes after which time the jacket temperature was 53.5° C. and pH=0.5. Blended phases while adding an additional 5.00 liters of concentrated ammonia. Blended phases for 10 minutes after which time the pH=2.3 and [Ga]aq=34.1 g/L [%E(Ga)=34.4%].

Added 8.0L more acidic gallium sulfate feed which contained 396.6g more gallium.

Blended phases 85 minutes at which time pH=8. and T(jacket)=60.8° C.

Next day the aqueous phase had a pH of 8.5 and was present as an emulsion. However, the organic/aqueous emulsion interface was sharp. Organic phase contained in this emulsion was recovered by allowing this solution to stand off to the side where it very slowly separated. %E(Ga)=58.1% at this point. Although significant gallium loading was accomplished, the %E(Ga) should have been nearly quantitative. It is believed that the ammonium hydroxide addition was too rapid, the actual tank temperature too low and/or the final pH too high for full loading to have occurred. Although not available in the current system, an in-the-reactor pH electrode would allow the ammonia to be added slowly on an as-needed basis such to to keep the pH from swinging too high too soon. High pH swings allow the formulation of the slow-to-dissolve $Ga(OH)_3$ white solids plus the slow-to-react $Ga(OH)_4^-$ species. Also helpful would be to include an in-the-tank temperature sensor so that reaction temperature >45° C. could be more easily guaranteed. The aqueous phase from this loading run was retained as feed for future runs since it still contained significant gallium values (16.3 g/L Ga).

Crowding

Added 35.96L pre-heated gallium sulfate crowding solution (30.9 g/L Ga, pH=0.5). Let temperature reach 50.2° C. then blended 60 minutes at which time the temperature was 56.3° C. An overnight timer failure allowed the system to cool to room temperature. This allowed a large colorless crystalline solid to crystallize out and plug the reactor drain.

This solid did not contain Gallium and it released ammonia on basification which indicates that it is probably just ammonium sulfate. This incident demonstrates the need to maintain warm temperatures to avoid these process interruptions.

Also as a result of the cool down, a much finer white precipitate had formed in the aqueous phase. This material was most probably gelatinous gallium hydroxide since it was soluble in acid.

The gallium hydroxide precipitate was dissolved by adding 7.5 liters of concentrated sulfuric acid. The plugged spigot was then cleared by siphoning out the liquid reactor contents, then dissolving the crystals in warm water by stirring over a period of several hours. The direct addition of concentrated sulfuric acid should probably be avoided since it can decompose the extractant if it is not diluted fast enough.

Washing

The organic phase was returned to the reactor and washed once with 7.26 kg of concentrated ammonia, then once with 18.93L of normal deionized water, all at 55° C. (Tjacket=60.8° C.). Phase separation was slow and so these washings were done one day apart.

Unfortunately later it was found that heating the extractant under the harsh conditions of strongly alkaline concentrated ammonia caused slow extractant conversion to the amide, $CH_3(CH_2)_7C(O)NH_2$. Therefore, these long contact times with concentrated alkaline ammonia are not recommended, nor are they necessary (see discussion hereinabove).

Washed the organic phase twice more with millipore deionized water (MPDI water). The aqueous washings were clear. Some crud present at the interface was removed after the last water wash which totalled 6.1L. This crud contained some extractant (4.49%) and gallium (1.27 g/L) and so was retained as feed for a subsequent run.

The organic phase was washed twice more with MPDI water for 60 minutes each time at 50°-60° C. Phase separation was quick and sharp. The organic phase after the second wash was extremely clear.

Stripping

The organic phase was stripped with 13 liters of 30% sulfuric acid prepared by using MPDI water and electronic grade sulfuric acid. Stripping was done at room temperature by blending the two phases for 20 minutes. The aqueous stripping solution had 32.2 g/L gallium. After blending for another 20 minutes the gallium level had risen to 40.0 g/L gallium. The aqueous phase was removed. A second strip was performed using a fresh 13 liters of the sulfuric acid strip solution and blending 60 minutes. This strip solution analyzed 9.5 g/L gallium. This second strip solution could be processed directly for its purified gallium value, gallium which is very pure, or it can be used as the first strip solution in a subsequent run to add to its gallium values substantially more.

The organic phase was washed thoroughly but just once with 5 gal MPDI water. Several short washes rather than one long one would have been more desirable.

Electronic grade 45%KOH, 11.36L, were used to neutralize the 40.0L gallium strip solution. After sitting several days, a white crystalline solid had settled to the bottom of the PE neutralization tank. The supernatant contained 30.3 g/L gallium and was a clear light yellow. The white crystals are water soluble and do not contain gallium, most probably potassium sulfate. The supernatant is directly useable feed for electrowinning into a gallium pool using a Pt anode. The fainter the yellow color of the supernatant, the purer the resultant gallium is. Completely colorless supernatants were achieved.

EXAMPLE 4

LOADING

Twenty liters of aqueous solutions containing 12 g/L gallium which were recovered as by-product recycle streams from Example 3 were blended with the organic phase from Example 3. The mixture was blended 60 min at 50°–53° C. The resultant raffinate only contained 0.0723 g/L gallium for % E(Ga)=99.4%. The raffinate was discarded. This complete gallium extraction allows an outlet for impurities, water and salts which is important to the overall process in order to maintain mass balance. Another 20 liters of the same feed solution was added to the organic phase and the mixture was blended for 60 min. at 55° C. This time the raffinate contained 5.44 g/L gallium for % E(Ga)=54.7%. This raffinate was saved as feed for the first extraction of a subsequent run. The total gallium loaded onto the organic was then 369.8g. Volume of the organic phase was taken and was 60.0 liters. The [NMP] was found to be 0.480M. Since the [NMP] was determined on a gallium loaded organic phase it might be a low value. Using the above value, the organic phase had a gallium capacity of 668.8g. Therefore, it was suspected that there was still gallium present on the extractant left over from the previous run. This suspicion was confirmed by directly analyzing the organic phase for gallium and it was found to be 870g Ga.

The organic phase was contacted with more gallium sulfate feed solution (14.7 g/L Ga,10.0L). Then 500 ml conc. $NH_3$ was added. Blended 20 min. Aqueous phase had 47.9 g/L gallium and 10.5L. Therefore not enough $NH_3$ had been added.

A fresh feed solution of 27.4 liters and 11.4 g/L gallium was blended with the organic phase and 1000 ml of concentrated ammonia. pHeq=2.5. Blended phases 40min. at 43°–45° C. Gallium concentration in the raffinate was 6.0 g/L for % E(Ga)=89.1%. The pH drifted down to 1.3. Another 1500 ml of concentrated aqueous ammonia were blended in and the mixture stirred for 60 min. The equilibrium pH was 2.3 and the gallium in the raffinate was 0.06 g/L. Therefore, the % E(Ga)=99.5%. The raffinate was discarded.

The organic phase was washed at 43° C. for 120 min with 18.93L DI water. The pH of the wash water was 6.5.

SCRUB

An attempt was made at this point to scrub impurities off of the organic by washing it with 7.6 liters of concentrated ammonium carbonate/ammonia solution. Blended phases for 15 min and obtained a clear yellow homogenous solution which undoubtedly must be a micro-emulsion. Apparently carbonato-hydroxamato-gallate complexes formed which would have the necessary surfactant properties to produce the micro-emulsion.

Dropping the pH using dry ice did not break the emulsion. Although it did turn creamy white with some clear bottom phase, this bottom phase analyzed 0.37M in extractant indicating that the micro-emulsion was still present to a significant extent. Any aqueous phase drawn from the bottom of the reactor should always have undetectable (<0.006M) extractant present in it.

Added 1170 ml electronic grade (99.7%) glacial acetic acid with thorough mixing. T(jacket)=55.0° C. Phases broke and $CO_2$ evolution occurred towards the end of the acetic acid addition. Phases were separating at about one inch per minute. This time extractant was not detectable in the bottom phase and the gallium concentration was just 1.0ppm and the pH=8.5. Essentially no ammonia or acetic acid odor. The carbonate had been successfully converted to bicarbonate with concomitant breakup of the problem carbonato-hydroxamato-gallate complexes. Therefore, a carbonate should not be used as part of a scrub solution since it forms these problem gallium complexes. Bicarbonate is alright however. Ammonium acetate/ammonia scrubs were used successfully in subsequent runs. The organic phase was very clear after the above procedure.

Exactly 22.7L of clear and colorless aqueous phase was drained to a very sharp AQ/ORG interface.

WASH

Washed the organic phase with 22.7L DI water using 60 min blending with T(Jacket)=56.0° C. Removed 18.93L of clear and colorless aqueous phase. Interface was sharp. Gallium and extractant were nondetectable in this wash solution and so it was discarded.

Washed again with 22.7L pre-warmed DI water for 60 min. T(jacket)=57.7° C. then almost immediately removed the clear and colorless aqueous phase. It took 15 min. to drain off the aqueous phase while avoiding losing minor amounts of organic phase droplets which had not yet combined with the top phase. When the interface was reached it was still breaking at a good rate. There was only about 100 ml of emulsion remaining and this collapsed quickly. The organic phase was "pulse stirred" a few times to mechanically dislodge any adhering aqueous phase droplets clinging to the walls or stirrer. The organic phase was a cloudy white color. This cloudiness is due to very small aqueous phase droplets still settling from the organic phase. In time, they settle out completely, producing a very clear organic phase. Removal of these droplets by waiting for them to settle out or by repetitive water washes is necessary since they may contain impurities.

Washed the organic phase again using 9.46L of MPDI water for 60 min. at 58.5° C. The system was allowed to stand overnight before draining the clear colorless aqueous phase. There was a small amount (100 ml) of clear and colorless middle phase and the organic phase was also clear. No gallium and just a trace of extractant could be found in the wash solution so it was discarded. One of the three stirrer blades had broken off.

STRIP

Exactly four liters of 30% sulfuric acid was blended with the organic phase for 60 min. with the two blade stirrer at room temperature (23° C.). This strip solution was the second strip solution of Example 2. The gallium content before stripping was 11,150 ppm and 4.0L. After the above strip the gallium concentration was 25,800 ppm and 7.08L; therefore the strip solution contained 44.6 g of gallium before the strip and 182.7 g of gallium afterwards.

Stripped a second time for 60 min. using 4.00L more of the second 30% sulfuric acid strip from Example 2, again at ambient temperature. Withdrew the aqueous phase. This time it totalled 4.0L. Therefore no water pickup occurred as it did for the first strip. The gallium concentration had increased from 11,150 ppm to 45,850 ppm for a total contained weight of gallium of 183.4 g. Therefore the water which diluted the acid in the first strip lowered the maximum possible gallium concentration in the first strip from 45.9 g/L to 25.8 g/L. It should be possible to obtain more gallium in the first strip by starting off with a higher concentration of sulfuric acid, say 40 or 50 percent or more.

The total gallium stripped from the organic phase then is 276.9 g or 97.0% of the total. Therefore percent stripping and phase separation were excellent for these strips even though the temperature was only ambient. Lower temperature operation in the presence of high concentration of strong acids is useful for extending extractant life.

The gallium was precipitated as the hydroxide by adding 3.48L of 45% KOH (Electronic Grade) to the second strip solution with stirring.

A 2.8L amount of this KOH solution was used to precipitate the gallium from the first strip solution. These Ga(OH)$_3$ precipitates would then be processed by re-dissolution in electronic grade 45% KOH and by electrowinning as described previously.

EXAMPLE 5

Modified the reactor of EXAMPLE 4 by replacing the water jacket with 61 meters of 1.27 cm copper tubing wrapped around the outside of the tank with THERMON® heat conductive putty plastered around the coils to provide optimum heat transfer. The tank was then wrapped with duct tape. This change avoids the need to drain the jacket prior to draining the reactor contents and it provides fast heatup rates.

The organic phase from Example 4 analyzed 9.94% extractant and 7.12% nonanoic acid. The nonanoic acid was produced from the extractant degradation noted in the previous examples. This hydrolysis by-product would normally flush from the system with the raffinate and washings as it is formed. However, the unintentional long heating in the presence of caustic ammonia formed it and the material containing it was used in the present example, recognizing that it would have some effect upon the results achievable.

Fatty carboxylic acids can be metal extractants and have very poor selectivity between metal ions. Therefore the processing to produce high purity gallium by solvent extraction using NAHA's preferably includes precautions against the effects of the carboxylic acid present. It was found that the best way to handle it is to include a dilute acid wash prior to stripping.

More extractant was added to the organic phase from EXAMPLE 4. Added 1815.6 g of extractant (as NMP). This resulted in an organic phase of 0.4282 molarity corresponding to 4.813kg NMP equivalent to 597.2 g of gallium.

A solid PE tank cover was fitted to the reactor replacing the PE bag used in EXAMPLES 2, 3, and 4.

The fluid in the copper coil wrap rapidly heated to >50° C., confirming the advantage of the copper coil over the fluid jacket for this aspect of temperature control.

LOADING

The reactor tank was washed with a HCL/HNO$_3$ aqueous mixture (113.55L DI water + 3.79L conc. HNO$_3$ + 3.79L conc. HCL). Stirred 3 hrs then drained.

The feed solution was analyzed for the metals we could analyze for by atomic absorption (AA). (Also contains large amounts of Sn, Pb and In). Vol.=34.07L.

| Element | Concentration |
| --- | --- |
| Ga | 13.38 g/L |
| Al | <10. ppb |
| Si | 2100. ppb |
| Cu | 30. ppb |
| Fe | 300. ppb |
| Mg | <12. ppb |
| Zn | 90. ppb |
| Sn | <5000. ppb |
| Pb | 2300. ppb |

The reactor was charged with 60L of organic phase (0.4282M NMP) and 15.16L of the above feed.

Added 2500ml concentrated ammonia with blending at 120 rpm and 43.0° C. (Tj=60.2° C.). Followed with 2500 ml more concentrated ammonia. T=51.0° C. in the reactor, Tj=60.2° C. and pH=1 (red litmus). Added another 2500 ml concentrated ammonia and stirred 30 min. Now pH=6.5 and T=50.0° C. This pH drifted up to 8.5 despite the blending in of 2500 ml glacial acetic acid at 120 rpm over 30 min. T=56.2° C. Added 2500 ml more glacial acetic acid and blended 15.0 min. pH=5.0 with Tj=59.9° C. and T=58.0° C. Added 2500 ml more glacial acetic acid and blended phases an additional 15.0 min. pH=5, T=56.0° C., Tj=60.2° C. Stirred 60 min. and let settle overnight at temperature.

Organic phase was an orange color. T=53.0° C., Tj=60.0° C.

The clear aqueous phase (pH 5.0) drained without any problem. [Ga]=1064 ppm (clear supernatant) (%E(Ga)=88.6%). Some white gelatinous solid, probably Ga(OH)$_3$ ppt, was dispersed in the aqueous phase. By centrifuging, it was determined that 45.7% of the unextracted gallium was as precipitate. Therefore 9.6% of the total gallium in the system ended up as this dispersed white precipitate. This is small and manageable but it is preferred that its formation be avoided altogether. Gallium hydroxide forms in the system if the ammonium hydroxide is added too fast for the available mixing rate. Therefore the ammonia addition rate should be slower than that used above either by dripping it in a more steady fashion and/or partially diluted with water. Faster blending would help also. Ammonia addition rate is most important towards the end o the addition where little free extractant and gallium remains and therefore the rate of gallium extraction slows. Higher temperature, i.e. closer to 60° C., speeds up the extraction rate significantly and helps to avoid gallium hydroxide precipitation.

Added 500 ml concentrated sulfuric acid in 7.58L DI water, with blending to wash off impurities from the carboxylic acid by using dilute acid. Blended phases for 15 min., pH=5.0. Obviously the buffering capacity of the system is very high and so the dilute acid wash will be done at a latter stage. It would be most desirable for the raffinate final pH to be about 2.5-3.0 to prevent the carboxylic acid impurity from extracting impurity metal ions. This would be easily achieved if in-tank pH metering were used.

Drained the aqueous phase and used stir bursts to drive out entrained aqueous droplets. The aqueous phase looked good (clear and colorless) but about 1.5L of slowly breaking emulsion remained at the interface. This emulsion layer was removed with the aqueous layer (54.197L total volume removed). The organic phase was clear.

Stripped 100 ml test sample of the organic phase by blending it with 10.00 ml of 20:20 $H_2SO_4$: 85%$H_3PO_4$ for 108 min. at 35° C. This aqueous strip solution analyzed 449,000 ppm Ga, 10 ppm Al, 0 ppm Si, 0 ppm Sn, 8.5 ppm Cu, <2 ppm Fe, 0.21 ppm Mg and 3.9 ppm Zn. Therefore the gallium metals purity in the organic phase at this stage is 99.9991% or 5N. Tin was removed to below detection limits during extraction. This was typical of the extraction performed and represents the point of tin removal. This is important as tin is a critical problem impurity for downstream ultrapurification procedures such as electropurification or recrystallization.

Added 18.95L more pre-heated feed to the reactor with the same analysis as the first feed used. Added 4.0L of concentrated ammonia slowly with good blending. Added the first 1.0L in 4.0 min. of blending then started the addition of each additional 500 ml at the start of each additional 5 min. of mixing until a total of 3.0L were added. Blended 15.0 min. more, pH=6.0. There was some Ga(OH)$_3$ ppt visible in the sight glass which is due to the fact that gallium is now in stoichiometric excess over the extractant. Total aqueous volume is 22L. Added 500 ml 95% sulfuric acid to dissolve the gallium hydroxide precipitate. This lowered the pH to 4.0 with T=47° C. Aqueous phase is a cloudy white due to the gallium hydroxide precipitate. Added 250 ml more 95% sulfuric acid. The pH was still 4.0. The pH dropped to a desirable 2.5 after the blending in of an additional 250 ml concentrated sulfuric acid. Most of the milkiness in the aqueous phase was gone at this point. Blended phases another 30 min. pH remained at 2.5. Phase disengagement was very rapid. Aqueous phase was withdrawn and stir bursts were used to remove held up aqueous droplets as usual. Total aqueous volume=22.7L. For ICAP analysis of the raffinate, see Table 4, sample number 1. Clearly substantial amounts of impurities, notably Ni, Pb, Sb, Sn and Zn, aren't even extracted in the first place.

WASHING

Washed the organic phase with 22.7L pre-heated DI water. Blended 30 min. and let stand overnight. Drained aqueous phase (22.7L) while at room temperature. For aqueous phase analysis see sample 2 of Table 4. At least Ni, Sb, Sn and Zn, are removed by this washing.

The system was heated to Tj=59.8° C. Prepared a dilute acid wash solution by dissolving 6.40 ml reagent grade 95% sulfuric acid in 22.7L MPDI water. Prepared this solution in the reactor with the organic phase. Blended phases for 120 min. This long blend time allows impurities which are of very low concentration, and therefore have very slow strip rates, to strip into the dilute acid since the extractant has a low affinity for them. Tj=50.0° C. after blending. Removed 22.7L of clear and colorless aqueous phase. There was only a very minor amount of emulsion at the interface. pH of wash solution was 2.5, exactly as desired. Analysis for sample #3 of Table 4 illustrates that dilute acid scrubbing removes Al and Sn at least.

Washed the organic phase with 22.7L of pre-heated MPDI water for 60 min. at 50° C. Aqueous phase analysis is sample 4 of Table 4 which demonstrates that at least Sn is removed by this wash. Undoubtedly, this would represent the removal of entrained aqueous phase from the previous step.

SCRUBBING

An ammonia/ammonium acetate scrub solution was prepared by slowly adding 3550 ml of semiconductor grade glacial acetic acid to 10.89 kg of semiconductor grade concentrated ammonia with stirring in a 37.85L PE tank. Enough MPDI water (570 ml) was added to bring the total volume to 18.93L. Stirred well.

Turned off the heating jacket and added 18.93L of the ammonia/ammonium acetate scrub solution to the organic phase from the above washing. Blended 60 min. and let stand overnight.

After 22 hours, drained crystal clear and colorless aqueous phase. Organic phase is also crystal clear. Interface is very sharp. Aqueous volume was about 15.14L. Temperature was ambient. Table 4, sample 5 is the ICAP analysis for the aqueous phase which illustrates that at least Pb, Sn and Zn are strongly removed by ammonia scrubbing. Presumably scrubbing with ammonia removes metals which strongly complex amines, the so-called "soft" metals.

WASHING

Added 22.7L MPDI water and blended phases 60.0 min. while rewarming the system to 45.0° C.

With Tj=45.0° C. the aqueous phase was removed and was found to be full of long fine white needles. This crystalline solid appeared to be wetted by both the aqueous and organic phases. About 9.46L of aqueous phase drained before the organic phase appeared. About 3.79L of the organic phase was withdrawn before it was stopped. The presence of the white needles made it difficult to tell where the liquid-liquid interface was. After a little practice it was possible to recognize the liquid-liquid interface where both liquids were very clear. The withdrawn organic-aqueous solution was filtered. The filter cake was fluffy white needles. Air dried weight was 475 g. This material analyzed to be nonanoic acid amide and clearly illustrates how long time exposure to concentrated ammonia causes some extractant conversion by transamination. Therefore scrubbing using diluted ethylene diamine is preferred instead (see discussion). Table 4, sample 6, lists the ICAP analysis of the aqueous phase. At least tin is removed in this wash. The wash was mainly intended to remove $NH_3$ and $NH_4OAc$.

The jacket temperature was raised to 60.0° C. to help solubilize the white solid. Added another 22.7L of MPDI water and blended for 60 min. Let settle overnight. Ammonia odor was present. Tj=53° C.

Drained clear and colorless aqueous phase. A few small white needles still remained. The interface was sharp. The organic phase was clear yellow as usual. The pH measured 9.0. Table 4, sample 7 lists the ICAP analysis of the aqueous phase. Almost no detectable impurities were found. The main purpose for this wash was also to remove entrained buffer.

Washed the organic phase with another 22.7L of MPDI water at 60.0° C. Removed aqueous phase after the system had cooled to room temperature. There were still some more solids but not enough to interfere with flow. Apparently the solid only separates when the system is allowed to cool.

Phase separation is very rapid in the absence of this solid. Volume of mixture removed = 11.73L. This separated into 3.785L of organic phase and 7.95L of aqueous phase. The aqueous phase was analyzed (Table 4, sample 8). Sn was the primary important impurity removed in this third post-ammonia scrub wash.

Withdrew 28.39L of creamy white lower layer. Within a few minutes a definite organic layer formed on the surface of 3.785L of this slowly breaking emulsion which had been set aside. The remaining material was placed in a warm bath overnight in a capped PE 22.7L jug. This solution separated overnight to about 1.89L of organic phase and a clear yellow aqueous phase pH=8.5. Therefore, warm temperatures are useful for promoting phase disengagements and so the system should ordinarily be held at >40° C. and, preferably, at about 50°-55° C. during these washings. Sample 9 of Table 4 is the ICAP analysis of this wash.

Added 22.7L of pre-heated MPDI water to the reactor followed by 6.40 ml of concentrated sulfuric acid (BAKER Analyzed). The phases were blended at 60.0° C. (Tj) for 60.0 min. The system was allowed to stir overnight. Withdrew the lower phase. As it flowed from the spigot, initially it was clear and colorless but soon turned creamy white again. Collected about 15.14L of this emulsion then noticed that the emulsion was indeed breaking. Thenceforth the clear and odorless aqueous phase was removed only as fast as it formed. It appeared as though drawing the emulsion down into the drainpipe and sight glass encourages the emulsion to break.

The pH of the clear aqueous solution=8.5. Hindsight would suggest that the aqueous phase should have been drawn off slowly from the start so that none of the emulsion was collected. ICAP analysis (Table 4, sample 10) shows the aqueous phase to be very clean.

Repeated the dilute acid wash by adding 22.7L of pre-heated water followed by 10.0 ml concentrated sulfuric acid with Tj=60.0° C. Ideally in a plant situation an internal pH electrode would allow the addition of just sufficient sulfuric acid to bring the equilibrium smoothly pH to 2-3. This would be much faster than the batchwise addition used here. After 2.2 minutes the phases still had not broken so 20.0 ml more conc. sulfuric acid were added and stirred 10 min. The pH was still about 8. Added 20.0 ml more acid and blended 10 min. Now pH=7. Added 40.00 ml more acid and the pH was still 7 after blending. Fifty more ml of acid were added and the pH after stirring was still 7.

The equilibrium pH dropped to 5 when another 50 ml of acid were blended in. Another 30.0 ml more of acid brought the pH down to the desirable value of 2. Preferably the acid should have been diluted with water first to avoid it decomposing some of the extractant before it was diluted.

The phases were blended for 60 minutes (Tj=60.0° C.). The next day 39.74L of clear and colorless pH=2.0 aqueous phase were withdrawn. This aqueous solution is sample 11 (Table 4). Clearly at least Al, Pb, and Zn are removed with a dilute acid scrub.

Scrubbed the organic phase with a dilute sulfuric acid (Baker Analyzed) solution (pH=1.0) made by dissolving 100.0 ml of concentrated acid in 22.8L of MPDI water. Blended for one hour at 55° C. Let stand overnight. Sample 12 of Table 4 indicates that at least Al, Pb, and Zn are removed by a pH 1. scrub. However, a significant amount of gallium was stripped also. This would be prevented or lowered by using higher extractant concentrations or smaller aqueous volumes.

Repeated the dilute acid (pH=1.0) wash but this time only used 15.14L of solution at 50° C. to decrease gallium losses. After washing recovered 16.28L of pH 1.5 aqueous phase. Sample 13 of Table 4 shows that at least Sb, Sn and Zn were removed by this dilute acid scrub. The scrub solution is now fairly clean, indicating the presence of high purity Ga on the extractant.

Reblended organic phase with 22.7L of MPDI water and 100 ml of sulfuric acid (Baker Analyzed ®). Mixing time was 90 min. and Tj=50.0° C. Removed 21.2L pH 1.5 clear and colorless aqueous phase the next day. Interface was very sharp as usual (except where noted above). Analysis from Table 4, Sample 14, shows that some Zn was removed by this dilute acid scrub. Otherwise, the washings were very clean inferring clean gallium on the organic phase.

Sample 15 of Table 4 is the ICAP analysis of MPDI for reference.

STRIPPING

The gallium was stripped from the organic phase by adding with blending 18.93L MPDI water to the reactor followed by 4.58 kg of Baker Analyzed ® 95% sulfuric acid. The jacket temperature rose from 30.6° C. to 31.7° C. during the addition. The phases were then blended 15.0 min. after which the jacket temperature had risen to 35.0° C. The jacket heater was off and the water was circulated using the circulator bath pump. Preferably the sulfuric acid should be prediluted and cooled to room temperature before adding it to the reactor. This would minimize extractant decomposition from the warm concentrated acid.

A sample of the strip solution analyzed 12.0 g/L gallium, or 274 g of Ga total. Since this was less gallium than expected it was suspected that there wasn't enough aqueous phase present to achieve good mixing. Therefore, an additional 11.35L of MPDI were added to the reactor, then the phases were blended for 20 min. Tj=34.4° C. Phase separation was very fast. 22.7L of aqueous phase was removed and collected in a 3.78L spigoted clean PE tank. This tank was previously cleaned using a dil HCl/HNO$_3$ rinse followed by MPDI rinsing.

22.7L of MPDI water were added to the organic phase still in the reactor and blended for 60 min. with the jacket heater off. This water wash removes entrained acid from the organic phase thereby preventing undue exposure of extractant to concentrated acid. Both phases became crystal clear on standing. The aqueous phase analyzed 86.9 ppm Ga, an insignificant amount.

Fifty milliliters of the organic phase were blended with 50.0 ml of 20/20 percent sulfuric/ phosphoric acids for 20.0 min. at 50° C. (Tj). The gallium in this aqueous strip solution was 83.9 ppm indicating that either a second strip should be performed, in which case the resultant aqueous phase would be used for the first strip of the next run, or this amount of gallium would be allowed to reside as holdup on the extractant. Both processes would be good with the latter producing the higher purity gallium.

The organic phase analyzed 8.73% NMP, 3.59% RCOOH and 0.11% RCONH$_2$. Therefore good extractant recycle is demonstrated and could be improved further by following suggestions herein for lessening degradation.

PREPARATION OF HIGH PURITY GALLIUM HYDROXIDE ELECTROWINNING FEED

Withdrew the clear and colorless aqueous phase in less than five minutes and the phases were already completely separated. The above 37.85L spigoted tank was used to receive the 30.28L of pregnant aqueous strip solution. Added a PE coated overhead stirrer to the 37.85L tank. With mixing added 5.44 kg of 30% ammonia which brought the pH to 9.0 at equilibrium. Added 2.27 kg of glacial acetic acid (HUNT Co., electronic grade) to bring the pH down to 5.0. The total volume was 37.09L.

After standing overnight the white gallium hydroxide had settled such that it came to the 16.26L mark on the tank of the total volume 37.85L. The supernatant analyzed only 87.1 ppm Ga indicating complete precipitation of the gallium values. After several days more the settled volume of the precipitate was 13.25L with a total liquid level still at 37.85L.

Twelve 250 ml centrifuge tubes were rinsed with aqua regia followed by four 125 ml MPDI washes each. A 11.36L spigoted PE crock with lid was cleaned out the same way.

The gallium hydroxide was collected by centrifuging the settled precipitate in these bottles by alternating six at a time. As a manufacturing setup one would employ a large centrifugation unit or one of the other options discussed previously. The collected precipitates were combined in the 11.36L tank by swirling with 45% KOH (HUNT, semiconductor grade) using a teflon spatula as an aid. A total of 1250 ml of 45% KOH was used. Too much KOH results in potassium gallate crystallization which is redissolved by adding MPDI water. Gallium hydroxide was found to dissolve readily in the 45% KOH if several minutes of mixing were used.

Using the overhead stirrer the mixture was mixed for two hours after adding an additional 8 pints of 45% KOH and covering. The mixture thinned and was the viscosity and color of milk. Stirred overnight.

Added one liter of MPDI water then stirred for one hour, then repeated this. The tank is now full. White solid was still present and since the KOH is in large excess it is believed that the solid is potassium gallate. Therefore, using less potassium hydroxide would have been better. The solids settled to give a clear supernatant containing 34.9 g/L gallium.

IAAP analysis was done on the purified gallium solution (Sample 16, Table 4). Detection limits were found to be 0.2 ppm for Sn, 0.5 ppm for In, 0.2 ppm for Pb, <1. ppm for Zn and 0.1 ppm for Cu. Actual emission peaks were obtained to clearly distinguish the signal over background. These five elements were not detected in the supernatant. Only three impurities were found and these were all at very low levels, 0.020ppm Mn, 0.150 ppm Ca and 0.5 ppm Fe. These three impurities are all readily removed during electrowinning and therefore do not represent a problem. The first five impurities listed above are, or can be, serious problems for electrowinning and have been removed from the gallium by the above solvent extraction procedure. It is suspected that the remaining three impurities enter through the semiconductor grade KOH. Therefore the KOH could be pre-purified further electrochemically to remove many metals, especially Mn, Fe and Cu. The extremely high KOH concentration prevented meaningful direct analysis of it, and any dilution of it results in impurity levels below detection limits.

The supernatant was electrowon to gallium metal and then the metal was analyzed for impurities by DC Arc Spectroscopy to give results reported in Table 5.

Some of the gallium hydroxide precipitate was sampled prior to the addition of KOH and vacuum oven dried (160° C. for 2 days) to produce gallium oxide. This solid was analyzed directly by DC Arc Spectroscopy. The following elements could not be detected: Pb, In, Zn, Ag, Hg and Sn. Copper was barely detected at <1 ppm. Fe, Si, Mg were 50, 1000 and 50 ppm respectively. Si and Mg are not electrowon and are therefore no problem in the production of high purity gallium. In fact these elements could have entered from the glass pipets used in isolating and preparing the sample for analysis.

Some of the potassium gallate solution was taken to dryness in a vacuum oven also and then analyzed by DC Arc Spectroscopy. Again, no problem impurities were found. Only Cu at <1 ppm, Si at 100 ppm, Mg at 50 ppm, Fe at 100 ppm, Na at 1000 ppm and K at >>10,000 ppm were found. All of these impurities are completely removed when the gallium is electrowon to metal. It could be beneficial to remove the Cu from the KOH by prior electrolysis as a precaution.

The insoluble white crystals which remain in the potassium gallate solution was found not to contain organics or gallium. They are very water soluble but not soluble in ethanol or acetone. If the excess KOH is added so that potassium gallium is produced directly from the acidic gallium sulfate strip solution then large quantities of this solid are produced. Therefore this solid must be just potassium sulfate.

TABLE 4

ICAP analysis for samples from Example 5 (in ppm). Illustrates impurity removal levels with various wash and scrubbing operations during the solvent extraction purification of gallium

| | I.D. | | | | | | | | |
|---|---|---|---|---|---|---|---|---|---|
| | Raffinate | Wash #1 | pH 2.5 Scrub | Water Wash | Ammon Scrub No. | Water Wash | Water Wash | Water Wash | Water Wash |
| Element | 1 | 2 | 3 | 4 | 5 | 6 | 7 | 8 | 9 |
| Ag | <0.12 | <0.12 | <0.10 | <0.12 | <0.10 | <0.11 | <0.10 | <0.10 | <0.10 |
| Al | <0.12 | <0.12 | 0.16 | <0.12 | <0.10 | <0.11 | <0.10 | <0.10 | <0.10 |
| Ba | <0.12 | <0.12 | <0.10 | <0.12 | <0.10 | <0.11 | <0.10 | <0.10 | <0.10 |
| Be | <0.12 | <0.12 | <0.10 | <0.12 | <0.10 | <0.11 | <0.10 | <0.10 | <0.10 |
| B | <0.12 | <0.12 | <0.10 | <0.12 | <0.10 | <0.11 | <0.10 | <0.10 | <0.10 |
| Ca | 0.45 | <0.12 | <0.10 | <0.12 | <0.10 | <0.11 | <0.10 | <0.10 | <0.10 |
| Cd | <0.12 | <0.12 | <0.10 | <0.12 | <0.10 | <0.11 | <0.10 | <0.10 | <0.10 |
| Co | <0.12 | <0.12 | <0.10 | <0.12 | <0.10 | <0.11 | <0.10 | <0.10 | <0.10 |
| Cr | <0.12 | <0.12 | <0.10 | <0.12 | <0.10 | <0.11 | <0.10 | <0.10 | <0.10 |
| Cu | <0.12 | <0.12 | <0.10 | <0.12 | <0.10 | <0.11 | <0.10 | <0.10 | <0.10 |
| Fe | <0.12 | <0.12 | <0.10 | <0.12 | <0.10 | <0.11 | <0.10 | <0.10 | <0.10 |
| Mg | <0.12 | <0.12 | <0.10 | <0.12 | <0.10 | <0.11 | <0.10 | <0.10 | <0.10 |
| Mn | <0.12 | <0.12 | <0.10 | <0.12 | <0.10 | <0.11 | <0.10 | <0.10 | <0.10 |
| Mo | 0.37 | <0.12 | <0.10 | <0.12 | <0.10 | <0.11 | <0.10 | <0.10 | <0.10 |

TABLE 4-continued

ICAP analysis for samples from Example 5 (in ppm). Illustrates impurity removal levels with various wash and scrubbing operations during the solvent extraction purification of gallium

| | | | | | | | | |
|---|---|---|---|---|---|---|---|---|
| Na | 42.7 | <0.12 | <0.10 | 0.31 | <0.10 | <0.11 | 0.23 | <0.10 | 0.11 |
| Ni | 2.65 | 0.35 | <0.10 | <0.12 | <0.10 | <0.11 | <0.10 | <0.10 | <0.10 |
| Pb | 0.16 | <0.12 | <0.10 | <0.12 | 0.13 | <0.11 | <0.10 | <0.10 | <0.10 |
| P | 0.56 | 1.06 | 0.20 | 0.40 | 0.17 | 0.23 | 0.21 | 0.36 | 0.16 |
| Sb | 0.65 | 0.13 | <0.10 | <0.12 | <0.10 | <0.11 | <0.10 | 0.10 | <0.10 |
| Si | 1.94 | <0.12 | <0.10 | <0.12 | 0.15 | <0.11 | <0.10 | 0.15 | <0.10 |
| Sn | 5.44 | 0.67 | 0.29 | 0.13 | 2.48 | 0.20 | 0.16 | 0.77 | 0.23 |
| Sr | <0.12 | <0.12 | <0.10 | <0.12 | <0.10 | <0.11 | <0.10 | <0.10 | <0.10 |
| Ti | <0.12 | <0.12 | <0.10 | <0.12 | <0.10 | <0.11 | <0.10 | <0.10 | <0.10 |
| V | <0.12 | <0.12 | <0.10 | <0.12 | <0.10 | <0.11 | <0.10 | <0.10 | <0.10 |
| Zn | 0.28 | 0.21 | <0.10 | <0.12 | 0.47 | <0.11 | <0.10 | 0.12 | <0.10 |
| K | 6.18 | <0.12 | 0.23 | 0.34 | <0.10 | 4.34 | 0.13 | <0.10 | 0.17 |
| In | <0.13 | <0.13 | <0.10 | <0.13 | <0.10 | <0.11 | <0.10 | <0.10 | <0.10 |
| Ga | 287. | <.5 | <.5 | <.5 | 2.5 | 3. | <.5 | <.5 | <.5 |

| | pH 8.5 Wash | pH 2 Scrub | pH 1 Scrub | pH 1.5 Scrub | pH 1.5 Scrub | MPDI Water | Purif.[a] KGa(OH)$_4$ | 22.5% KOH |
|---|---|---|---|---|---|---|---|---|
| Element | 10 | 11 | 12 | 13 | 14 | 15 | 16 | 17 |
| Ag | <0.10 | <0.10 | <0.10 | <0.10 | <0.10 | <0.12 | — | <3.00 |
| Al | <0.10 | 0.21 | 0.20 | <0.10 | <0.10 | <0.12 | — | 4.75 |
| Ba | <0.10 | <0.10 | <0.10 | <0.10 | <0.10 | <0.12 | — | <3.00 |
| Be | <0.10 | <0.10 | <0.10 | <0.10 | <0.10 | <0.12 | — | <3.00 |
| B | <0.10 | <0.10 | <0.10 | <0.10 | <0.10 | <0.12 | — | <3.00 |
| Ca | <0.10 | <0.10 | <0.10 | <0.10 | <0.10 | <0.12 | .15 | <3.00 |
| Cd | <0.10 | <0.10 | <0.10 | <0.10 | <0.10 | <0.12 | — | <3.00 |
| Co | <0.10 | <0.10 | <0.10 | <0.10 | <0.10 | <0.12 | — | <3.00 |
| Cr | <0.10 | <0.10 | <0.10 | <0.10 | <0.10 | <0.12 | — | <3.00 |
| Cu | <0.10 | <0.10 | <0.10 | <0.10 | <0.10 | <0.12 | <.1 | <3.00 |
| Fe | <0.10 | <0.10 | <0.10 | <0.10 | <0.10 | <0.12 | .5 | <3.00 |
| Mg | <0.10 | <0.10 | <0.10 | <0.10 | <0.10 | <0.12 | — | <3.00 |
| Mn | <0.10 | <0.10 | <0.10 | <0.10 | <0.10 | <0.12 | .02 | <3.00 |
| Mo | <0.10 | <0.10 | <0.10 | <0.10 | <0.10 | <0.12 | — | <3.00 |
| Na | <0.10 | <0.10 | <0.10 | <0.10 | 0.17 | <0.33 | — | 92.00 |
| Ni | <0.10 | <0.10 | <0.10 | <0.10 | <0.10 | <0.12 | — | 6.40 |
| Pb | <0.10 | 0.24 | 0.13 | <0.10 | <0.10 | <0.12 | <.2 | <3.00 |
| P | 0.12 | 0.15 | 0.31 | 0.39 | 0.29 | 0.14 | — | 5.23 |
| Sb | <0.10 | <0.10 | 0.12 | 0.10 | <0.10 | <.012 | — | <3.00 |
| Si | <0.10 | <0.10 | 0.21 | 0.18 | 0.17 | <0.12 | — | 14.8 |
| Sn | <0.10 | <0.10 | <0.10 | <0.10 | <0.10 | <0.12 | <.2 | <3.00 |
| Sr | <0.10 | <0.10 | <0.10 | <0.10 | <0.10 | <0.12 | — | <3.00 |
| Ti | <0.10 | <0.10 | <0.10 | <0.10 | <0.10 | <0.12 | — | <3.00 |
| V | <0.10 | <0.10 | <0.10 | <0.10 | <0.10 | <0.12 | — | <3.00 |
| Zn | <0.10 | 0.22 | 0.12 | 0.16 | 0.13 | <0.12 | <.1 | <3.00 |
| K | <0.10 | <0.10 | <0.10 | <0.10 | <0.10 | <0.12 | — | <3.00 |
| In | <0.10 | <0.10 | <0.10 | <0.10 | <0.10 | <0.13 | <.5 | <3.01 |
| Ga | <.5 | 2.2 | 930. | — | — | <0.5 | 34,900 | <3.00 |

[a] No other impurities were observed. Detection limits for these other possible impurities were not determined for this high salt medium. Listed impurity detection limits were examined by scanning ICAP analysis to insure absence of a peak.

TABLE 5

High Purity Gallium by Solvent Extraction Using N-alkyl Hydroxamic Acids[a]

| Element[b] | Feed (ppb) | Purified[c] Gallium (ppb) | Detection[d] Limit (ppb) |
|---|---|---|---|
| Fe | 4,000 | ND | 5. |
| Cu | 2,000 | 150 | .1 |
| Zn | 2,000 | ND | 10. |
| Cd | <500 | ND | 10. |
| In | 8,000 | ND | 1. |
| Tl | <500 | ND | .1 |
| Ge | <1,000 | ND | 4. |
| Sn | 9,000 | ND | 1. |
| Pb | 32,000 | 150 | 10. |
| Ca | ND | ND | 1. |
| Mg | ND | ND | .1 |
| Hg | ND | ND | 10. |
| Ag | ND | ND | .1 |

[a] Analyses by DC Arc Spectroscopy.
[b] No other elements were observed.
[c] Electrowon using gallium pool and Pt anode.
[d] M. S. Wang, APPLIED SPECTROSCOPY 1970 24(1) 60. Table VI.

EXAMPLE 6

Setup identical to Example 5 except introduced a long 4-bladed 20.32 cm sweep stirrer shaft and blade. This alteration allows the blending of small aqueous volumes with the entire organic phase with low tip speed.

The organic phase was the same kerosene solution regenerated by the previous run (Example 5). This solution was 0.360M in NMP extractant. The solvent is Kermac 470B petroleum distillate and total volume is 60L. This amount of extractant has a theoretical maximum loading of 502 g of gallium.

The crude gallium Feed source is the same as that used for Example 5 and had a gallium level of 15.72 g Ga/L (15,720. ppm).

Table 6 sets forth ICAP analytical data on impurities for this Example.

LOADING

With the jacket at 59.8° C., 32.0L of FEED solution were added with blending. This took seven minutes. Added 6.0L of concentrated aqueous ammonia over a three minute period. The temperature of the mix in the reactor (T) rose to 37.5° C. and the pH~1.

The stir rate was ~90 rpm. Because gallium has slow reaction kinetics, it would have been better to have preheated the organic phase. The concentrated ammonia should not be preheated since the emission of copious amounts of gaseous ammonia would result. The reactor mixture warmed to 41.0° C. after another 40 min.

Three more liters of concentrated ammonia were added. This brought the equilibrium pH to 2.5-3.0. The reactor mixture temperature now reads 51.7° C. The stir rate picked up with increasing temperature and was reduced accordingly to maintain about 90 rpm. Stirred for 20 minutes then allowed only two minutes for phase separation.

The aqueous phase was crystal clear and colorless with pH=2.5, T=50.0° C. and 4200 ppm Ga. This represents %E(Ga)=68.3%

Added another 1.50L of concentrated ammonia with blending and blended 20 min. Now pH=8.0, T=52.0° C. and [Ga]eq=193 ppm for %E(Ga)=98.54%, which is excellent extraction.

Removed the aqueous phase, volume ~37.85L, clear and colorless. There was a little cloudiness towards the end of the drain ($\leq$1L). There was some emulsion at the interface which was left with the organic phase. "Stir bursts" were used to remove held up aqueous droplets.

Sample 1 of Table 6 is the ICAP analysis of the raffinate. At least nickel, silicon, and zinc are important impurities left behind in the raffinate. This illustrates that some purification is achieved by merely just extracting the gallium.

WASHING

Added 7.57L MPDI water and blended 10 min. at 240 rpm. Some emulsion in sight tube, therefore added 2.32 kg semiconductor grade glacial HOAc. Blended phases 10.0 min. pHeq=5.0. After 6 min. the phases hadn't started separating. Therefore added 11.36L MPDI water and blended 5.0 min. T=37.5° C. Reduced stir speed to 120 min. Now phases could be seen breaking out slowly. T=44.3° C., pH=8.5.

The aqueous phase is clear and colorless. The key to good phase separation appears to be a combination of salt concentration in the aqueous phase or high/low pH and the temperature.

Finished withdrawing aqueous phase. The phase interface was desirably very sharp. Collected about 26.51L of aqueous phase. On standing the organic phase continued to slowly release a small amount (~200 ml) of aqueous phase.

Sample 2 of Table 6 gives the ICAP analysis for the aqueous wash solution. These results show that at least nickel, silicon, and more importantly, zinc, are removed by this washing operation.

SCRUBBING

An ammonia/ammonium acetate buffer scrub solution was prepared as was done for Example 5. This solution smells strongly of ammonia and therefore has be used with ventilation.

Added 7.57L of the ammonia/ammonium acetate scrub solution. Blended phases 10.0 min. T=41° C. Drained 7.57L of clear and colorless aqueous phase. Interface was sharp.

Sample 3 of Table 6 is the impurity analysis of the used scrub solution. The removal of at least the important impurity, zinc, by this scrubbing operation is clearly illustrated. Nickel from the nickel electrode used in the dissolution of the gallium to produce the initial feed material, is strongly removed also.

Scrubbed the organic phase a second time with ammonia/ammonium ion buffer solution. Phase separation rate was very good. No CRUD present at the interface with smooth coalescence from tiny droplets to large ones. The phases broke rapidly. No amide needles could be seen which illustrate that extractant degradation doesn't occur in the short time needed to scrub impurities off of the organic phase with ammonia/ammonium buffer.

Withdrew 11.36L aqueous phase. Organic phase only slightly hazy. T=38° C.

Sample 4 of Table 6 is the ICAP analysis of this used scrub solution. Again, at least nickel and zinc are removed.

WASHING

Added 7.57L of MPDI water to the reactor, followed by the slow addition of 40.00 ml of concentrated semiconductor grade sulfuric acid. This addition took 8 min. Blended phases 10.0 min. After this time T=39° C. and pH=8.5. Phases were separating slowly so added 50.00 ml more sulfuric acid with blending. Blended 5.00 min more. Phase separation was still very slow and pH still about 8 and T=39.7° C. Repeated the above addition of 50 ml of sulfuric acid. T=45° C. afterwards. Then added 11.35L MPDI water. Tj has been 60.0° C. throughout. Blended phases 5.0 min. and added 50 ml more sulfuric acid at the two minute mark. Phases started to break when the stirring was stopped but aqueous phase still was creamy. pH=8.0 and T=39.0° C. Future runs should use prediluted, preheated sulfuric acid solution and an in-the-tank, pH electrode. Added another 100 ml sulfuric acid and blended 10 min. Aqueous phase still creamy and pH still about 8.

T=39.0° C. Odor of ammonia. Added 200 ml more sulfuric acid and blended phases 10.0 min. Stir rate still 90±15 rpm (moderate vortex). Now pH=6.5 and T=41.0° C. Ammonia odor gone. Blended phases for another 10.0 min. after adding 100 ml more sulfuric acid. Used a slower stir rate (60±15 rpm). Removed a 1.89L sample which gave T=43.0° C. and pH=7.0. Got 3.8 cm layer of organic in about 1.5 min. Aqueous phase still creamy. Repeated the addition and 10.00 min blending in of another 100 ml sulfuric acid. This time phases separated rapidly. pH=2.2. Withdrew 22.7L of aqueous phase which had a 5-7.5 cm white cap on it. The white cap may be creamy emulsion or solids.

Sample 5 of Table 6 is the ICAP analysis of the aqueous phase. This wash is primarily to remove NH$_3$/NH$_4$OHc scrub solution.

Added 22.7L of 60° C. preheated MPDI water with 10.00 ml sulfuric acid and blended phases 15 min. Removed 1.89L of liquid which gave pH=6.5 and was about half clear and colorless and the other half white creamy organic. T=46.0° C. Added 50 ml of sulfuric acid and blended 10.0 min. This time the emulsion was composed of large droplets rather than the very fine ones (creamy) present before. Therefore this pH appears to be at the transition between emulsion and rapid phase breakage. The pH was 2.5 and T=46.5° C. The 1.89L withdrawn rapidly separated into two phases—a white creamy organic top layer (15–20 vol %) and the rest a clear and colorless aqueous layer. Therefore a pH of 2.5 is sufficiently low to break the emulsion. The total clear and colorless aqueous phase was withdrawn.

Sample 6 of Table 6 is the ICAP analysis of the aqueous phase. These results illustrate that at least aluminum, nickel, lead, antimony, silicon, zinc and indium are all removed by dilute acid scrubbing of the organic phase. Therefore dilute acid scrubbing is very effective in removing problem impurities from the gallium in the current process.

Added 11.36L of 50° C. MPDI water and 25 ml sulfuric acid and blended 10.0 min. The phases separated rapidly. The aqueous phase was clear and colorless. T=46.5° C., pH=1.6. An 11.36L aqueous phase was withdrawn. A small amount of breaking emulsion still lingered at the interface.

Sample 7 of Table 6 are the impurities analyses for the aqueous phase. Again indium is removed by the dilute acid scrub. Since the aluminum, indium, lead, calcium, and nickel levels found in this dilute acid wash are far less than that for Sample 6, this indicates that most of these impurities are removed by just one dilute acid scrub. Zinc and silicon are also removed.

Added 11.36L preheated MPDI water with 10.00 ml sulfuric acid. Withdrew the aqueous phase which was clear, colorless, 46.5° C., pH 2.5. The phases had separated rapidly and it is just the last 10% or so which controls how quickly the aqueous phase can be withdrawn. There is a small amount of white CRUD at the interface.

Sample 8 of Table 6 is the ICAP analysis for the aqueous phase. Very pure gallium is inferred from the lack of impurities present in this dilute acid scrub.

Repeated the above 10 ml sulfuric acid scrub using 22.7L MPDI water. Blended phases 15 min. at 200 rpm. Withdrew the pH 2.5 aqueous phase. This time removed the CRUD with the aqueous phase. This resulted in 1.3 cm of white head on the 22.7L of clear and colorless aqueous phase.

Sample 9 of Table 6 is the ICAP analysis for the aqueous phase. Conclusions are similar to those for sample 8. The removal of iron by dilute acid scrubbing is demonstrated also.

Reblended with 11.36L MPDI and 30.00 ml sulfuric acid. Removed aqueous phase which was cloudy white and appeared to have a dispersed white precipitate or emulsion in it. Again the CRUD was removed with the aqueous phase which again resulted in ~1.3 cm of white organic rag layer on top of the 11.36L of aqueous solution. Organic phase was almost clear.

Sample 10 of Table 6 is the ICAP analysis for the aqueous phase. Conclusions are similar to those for sample 9.

STRIPPING

Added 6.8 kg grade sulfuric acid to 9.84L of MPDI water. Final volume=13.63L. Added this solution to the reactor containing the organic phase. This addition took 12 min. This sulfuric acid solution was very hot. In the future, this solution should be prepared ahead of time so that it can be cooled. Phases were blended 20.0 min. Aqueous phase separated rapidly and was clear light yellow.

The light yellow color indicates incomplete impurity removal. This was later traced (by repetition) to aqueous holdup on the organic due to insufficient time allowed for full separation during the washing and scrubbing steps. Therefore enough time should be provided so that as much of the aqueous phase as can separate is allowed to. This can be monitored by watching the aqueous phase volume changes in the sight tube after the bulk of the aqueous phase has already been withdrawn.

The gallium concentration in the aqueous strip solution analyzed to be 28.3 g/L and $V_T$=12.1L for 344 g total gallium. It took 19 min. to drain the aqueous phase.

GALLIUM HYDROXIDE PRECIPITATION

To the aqueous strip solution in a separate tank was added three 3.63 kg bottles of semiconductor grade aqueous concentrated ammonia. Ammonia addition took 26 min. The ammonia was not added rapidly because of spattering. More dilute solutions would avoid this spattering. $V_T$ now is 21.16L.

The gallium hydroxide was allowed to settle to 11.73L of precipitate in the tank with the supernatant being 9.84L. The supernatant analyzed only 502 ppm Ga indicating a high precipitation of gallium since the initial concentration was 16,170 ppm (96.9% precipitation). Collected the gallium hydroxide precipitate by centrifugation in lots of 1500 ml each. Centrifugation conditions were 10,000 rpm for 10 min. with polypropylene containers. Sample 11 of Table 6 summarizes the analyses for impurities in the supernatant.

Production of Potassium Gallate from Gallium Hydroxide

The gallium hydroxide was dissolved up in clean polypropylene containers using portions of semiconductor grade 45%KOH to transfer the precipitates from the centrifuge bottles. A clean teflon spatula was used to loosen and stir the cake.

On standing, this slurry separated into ~⅓ white solid and ~⅔ supernatant. The gallium level in the supernatant was 65.4 g/L. Most of the undissolved solid, if not all, is $KGa(OH)_4$. This can be brought into solution by dilution with high purity water. A final gallium concentration of 30–35 g/L produces about the optimum solubility/concentration conditions.

Sample 12 of Table 6 presents the impurity analysis of the potassium gallate supernatant. It is significant that the tin value is below the detection limit of 2.96 ppm. Since tin is below the detection limit in the raffinate and wash solutions, the results do not establish which procedures removed the tin. Reduction to gallium metal followed by spectrographic analysis or at least the equivalent, as was done in Example 5, is necessary to detect this problem impurity analytically.

Table 6 also includes an analysis of 5% $HNO_3$ which was used to dilute the analytical samples for comparison, with all metals being below detection limits.

ORGANIC PHASE

The organic phase in the solvent extractor was blended with normal DI water for 60 min. The pH of the wash water was 1.6. Washed once more. The pH of washings is now 6. Organic is clear yellow. $V_{org}$=49.5L.

The organic phase analyzed 0.269M extractant by visible spectra photometric analysis and had a density of 0.8328 g/ml. The organic losses apparently came from entrainments in rag layers at the interfaces since these were often removed with the aqueous phases. On standing, these rag layers break into good organic and aqueous phases. Therefore for high organic recycle percentages these organic portions should be retrieved and returned to the solvent extraction purification reactor. A simple means of doing this was found to be to place the aqueous phase with the rag layer in a spigoted tank. Let it stand for a day, then drain out the aqueous phase. The organic layer is then easily collected and returned to the system.

in acid form, are not significant extractants for metals and have little tendency to cause emulsion formation.

When carboxylic acids are present in the extractant, it is advantageous to conduct washing procedures at dilute acid pH, such as about 1.5 to 2.5 to lessen the metal extracting tendency of the carboxylic acids. However, in order to have good gallium extraction at these pH ranges, it is advantageous to use fairly high concentrations of hydroxamic acid extractant, such as from 20 to 30% or more by weight of the organic phase utilized. The higher extractant concentrations tend to shift the

TABLE 6

ICAP analysis for samples from Example 6 (in ppm). Illustrates impurity removal levels with various wash and scrubbing operations during the solvent extraction purification gallium.

| Element | 5% HNO$_3$ | Raffinate 1 | pH 8.5 wash 2 | NH$_3$ Scrub 3$^a$ | NH$_3$ Scrub 4 | pH 2.2 5$^b$ | pH 2.5 Sample 6$^b$ | pH 1.6 7 | pH 2.5 8 | dilH$_2$SO$_4$ 9 | dilH$_2$SO$_4$ 10 | Supernatant 11 | KGa(OH)$_4$ 12 |
|---|---|---|---|---|---|---|---|---|---|---|---|---|---|
| Ag | <.10 | <.10 | <.10 | <.10 | <.10 | <.10 | <.10 | <.10 | <.10 | <.10 | <.10 | <1.00 | <2.96 |
| Al | <.10 | <.10 | <.10 | <.10 | <.10 | <.10 | 1.00 | <.10 | <.10 | <.10 | <.10 | <1.00 | <2.96 |
| Ba | <.10 | <.10 | <.10 | <.10 | <.10 | <.10 | <.10 | <.10 | <.10 | <.10 | <.10 | <1.00 | <2.96 |
| Be | <.10 | <.10 | <.10 | <.10 | <.10 | <.10 | <.10 | <.10 | <.10 | <.10 | <.10 | <1.00 | <2.96 |
| B | <.10 | <.10 | <.10 | <.10 | <.10 | <.10 | <.10 | <.10 | <.10 | <.10 | <.10 | <1.00 | <2.96 |
| Ca | <.10 | <.106 | <.10 | <.10 | <.10 | .22 | .32 | <.10 | <.10 | <.10 | <.10 | <1.00 | <2.96 |
| Cd | <.10 | <.10 | <.10 | <.10 | <.10 | <.10 | <.10 | <.10 | <.10 | <.10 | <.10 | <1.00 | <2.96 |
| Co | <.10 | <.10 | <.10 | <.10 | <.10 | <.10 | <.10 | <.10 | <.10 | <.10 | <.10 | <1.00 | <2.96 |
| Cr | <.10 | <.10 | <.10 | <.10 | <.10 | <.10 | <.10 | <.10 | <.10 | <.10 | <.10 | <1.00 | <2.96 |
| Cu | <.10 | <.10 | <.10 | <.10 | <.10 | <.10 | <.10 | <.10 | <.10 | <.10 | <.10 | <1.00 | <2.96 |
| Fe | <.10 | <.10 | <.10 | <.10 | <.10 | <.10 | <.10 | <.10 | <.19 | .22 | .14 | <1.00 | <2.96 |
| Mg | <.10 | <.10 | <.10 | <.10 | <.10 | <.10 | <.10 | <.10 | <.10 | <.10 | <.10 | <1.00 | <2.96 |
| Mn | <.10 | <.10 | <.10 | <.10 | <.10 | <.10 | <.10 | <.10 | <.10 | <.10 | <.10 | <1.00 | <2.96 |
| Mo | <.10 | <.10 | <.10 | <.10 | <.10 | <.10 | <.10 | <.10 | <.10 | <.10 | <.10 | <1.00 | <2.96 |
| Na | <.10 | 10.6 | 1.10 | .19 | <.10 | <.10 | <.10 | <.10 | <.10 | <.10 | <.10 | <1.00 | 5.81 |
| Ni | <.10 | .17 | 2.16 | 4.06 | 1.01 | <.10 | .25 | <.1 | <.10 | <.10 | <.10 | <1.00 | 4.02 |
| Pb | <.10 | <.10 | <.10 | <.10 | <.10 | <.10 | .37 | <.10 | <.10 | .22 | <.10 | <1.00 | <2.96 |
| P | <.10 | .19 | .21 | .10 | <.10 | <.10 | .19 | <.10 | <.10 | <.10 | .15 | <1.00 | 3.57 |
| Sb | <.10 | <.10 | <.10 | <.10 | <.10 | <.10 | .16 | <.10 | <.10 | <.10 | .19 | <1.00 | <2.96 |
| Si | <.10 | .43 | .32 | <.10 | <.10 | .30 | .84 | .21 | .20 | <.15 | .27 | 1.79 | 17.4 |
| Sn | <.10 | <.10 | <.10 | <.10 | <.10 | <.10 | <.10 | <.10 | <.10 | <.10 | <.10 | <1.00 | <2.96 |
| Sr | <.10 | <.10 | <.10 | <.10 | <.10 | <.10 | <.10 | <.10 | <.10 | <.10 | <.10 | <1.00 | <2.96 |
| Ti | <.10 | <.10 | <.10 | <.10 | <.10 | <.10 | <.10 | <.10 | <.10 | <.10 | <.10 | <1.00 | <2.96 |
| V | <.10 | <.10 | <.10 | <.10 | <.10 | <.10 | <.10 | <.10 | <.10 | <.10 | <.10 | <1.00 | <2.96 |
| Zn | <.10 | .13 | .38 | .39 | .11 | <.10 | .19 | <.10 | .11 | <.10 | <.10 | <1.00 | >1000. |
| K | <.10 | >1000. | 211. | 81.8 | 22.6 | 3.14 | .38 | <.10 | <.10 | <.10 | <.10 | <1.00 | <2.96 |
| In | <.10 | <.10 | <.10 | <.10 | <.10 | <.10 | .17 | .10 | <.10 | <.10 | <.10 | .35 | <.10 |
| Ga | <.10 | 72.5 | — | — | — | 15.1 | — | — | — | — | — | 502. | 65,400. |

$^a$Average of triplate analyses.
$^b$Average of duplicate analyses.

The sulfuric acid and aqueous ammonia referred to as "concentrated" in the above procedures were about the maximum concentrations generally available for laboratory use, i.e., about 95% by weight sulfuric acid and about 27% by weight ammonia.

As noted in the procedures, better instrumentation, particularly for pH and temperature control, would have avoided some complications and possibly permitted improved results. Thus, in some of the loading procedures during ammonia addition, the pH shifted rapidly from a low acidic pH to a pH near 8 or higher, at times causing excessive gallium hydroxides precipitation. The gallium extraction still occurs at the higher pH, but is less selective than if conducted at a lower pH. The lower selectivity in the extraction has limited effect on the overall purification process, as washing steps at lower pH can provide the selectivity to remove impurities. The higher pH also contributes to emulsion formation, which tends to cause phase separations to take longer and be less sharp. This is especially the case when substantial amounts of carboxylic acid are present (from extractant degradation). The carboxylic acids are generally in ionic salt form at alkaline pH, but will be in acid form at low acidic pH. The carboxylic acids, when gallium extraction isotherm to more acidic pH, and thus to provide a fairly complete gallium extraction at a lower pH than obtainable in extractions with less concentrated extractant solutions. The degree of extraction is, of course, involved when the gallium is being retained on the hydroxamic acid extractant during washing with aqueous media, as well as when the gallium is extracted from aqueous media.

With further reference to the illustrative procedures, in general less than optimum extractant concentrations were used. Thus, use of 20 to 30% or so extraction concentrations would contribute to better results, particularly for washing at relatively low pH. In addition, in a number of procedures, the extractant which was utilized had been subject to considerable degradation in previous operations. Thus, results could be improved by starting with extractant relatively free from carboxylic acids, and utilizing pH and temperature control to avoid degradation during operations. The contact times can also be shortened by operating under conditions to minimize emulsion formation and permit good separations.

In general, pure water is a good solvent to use in purification procedures because it is available in highly pure form. However, in the present procedures there are often advantages to conducting washing at acidic pH's, and dilute acid solutions have been found effective for removing many metal ions. Therefore it may be appropriate in most instances to wash with dilute acid rather than with water alone.

The purification procedures herein are especially suitable for removing such impurities as tin, lead, zinc, indium and copper. Of these, zinc, tin and indium are particular problem impurities as they are close to gallium in the electromotive series and difficult to remove by electrorefining. Iridium, indium, and copper are difficult to remove electrolitically if present in amounts greater than 50-100 parts per billion but can be removed if first reduced below such limits by the extraction and washing procedures described herein. The ammonia scrub procedures herein are especially important for removing soft metals such as silver, zinc, cadmium, nickel, copper and mercury, and also remove significant amounts of tin. In some of the illustrative procedures, such as Example 5, there was not a large amount of copper present and the amount removed was apparently below detection limits so as not to be observed in the wash solutions. Actually, because of detection limits and dilution, it is more difficult to measure impurities in wash solutions than in final solid product. It is, nevertheless, maintained that copper is removed in the present procedure, and noted that it was found at only 150 parts per billion in the electrowon product in Table 5. The dilute acid washes are effective for removing a number of metal impurities, especially tin and aluminum, and also lead and zinc.

In conducting the amine scrubbing operations herein, the operations are conducted under conditions to have free ammonia or amines present such as at pH's above 8, or between 8 and 9 in the case of buffered solutions. The free ammonia or amines are far better complexing agents than the protonated forms which are present at acidic pH. For removal of copper, it may be desirable to use relatively concentrated ammonia solutions, although similar results may be obtainable by repetitive procedures with lower concentrations.

As with extraction, the use of slightly elevated temperatures is beneficial in washing and scrubbing operations. Temperatures over about 35 or 40° C. or so improve the rate of extraction, and also improve the rate of separation in washing and scrubbing operations. However, it is desirable to avoid temperatures sufficiently high to cause excessive extractant degradation. It is generally desirable to employ temperatures in the range of about 35° C. to 90° C., or more narrowly, about 40° C. to about 70° C. for the bulk of the extraction and washing operations.

What is claimed is:

1. The process of purifying gallium in which an organic solvent solution containing hydroxamic acid complexes of gallium is blended with an immiscible aqueous solution of ammonia or amine to form ammonia or amine complexes of metal impurities, and the solutions are then separated.

2. The process of claim 1 in which complexes of at least one of copper and zinc are present with the gallium complexes and removed to a significant extent in the aqueous solution.

3. The process of claim 1 in which a concentrated aqueous ammonia solution is employed.

4. The process of claim 1 in which an ammonium salt buffering agent is present to buffer the solution to a alkaline pH.

5. The process of claim 1 in which the amine is an alkylene polyamine.

6. The process of claim 5 in which the amine is ethylene diamine.

7. The process of claim 1 in which the amine is an alkyl amine.

8. The process of claim 1 in which ammonia solution is employed and its contact time with the organic solvent solution is less than one hour.

9. A process of purifying gallium which comprises dissolving gallium-containing source material to form an aqueous gallium-containing solution, extracting the aqueous solution with an organic solvent containing an N-organohydroxamic acid to extract gallium into the organic solvent phase, washing the organic solvent phase with an aqueous liquid to remove metal impurities, and stripping the gallium from the organic solvent phase into an aqueous phase; wherein the amount of N-organohydroxamic acid used for extracting the aqueous solution is in excess of that needed to complex the gallium present, and after the extraction the organic solvent phase is blended with additional gallium-containing aqueous phase to provide an amount of gallium in excess of the amount the hydroxamic acid is capable of complexing in order to crowd impurities off the hydroxamic acid containing organic phase; and wherein the organic solvent is subsequently separated from the additional aqueous phase.

10. The process of purifying gallium in which gallium is loaded from an aqueous phase onto a hydroxamic acid extractant in an organic diluent employing an amount of hydroxamic acid in excess of that needed to complex all of the gallium, separating the organic diluent from the aqueous phase and blending the organic diluent phase with additional gallium-containing aqueous phase to provide an amount of gallium in excess of the amount the hydroxamic acid present is calculated to be capable of complexing, in order to crowd metal impurities off the hydroxamic acid containing organic phase and separating the additional gallium-containing aqueous phase from the organic phase.

11. A process of purifying gallium which comprises washing an organic solution containing hydroxamic acid complexes of gallium and metal impurities selected from the group consisting of silver, zinc, cadmium, nickel, copper and mercury with an aqueous solution to remove metal impurities:

12. The process of claim 11 in which metal impurities are reduced to less than 500 parts per billion, based on gallium.

13. A process of purifying gallium which comprises washing an organic solution containing hydroxamic acid complexes of gallium and metal impurities selected from the group consisting-of tin indium, lead, zinc and copper with an aqueous solution to remove metal impurities.

14. The process of claim 13 in which metal impurities include at least one of tin and zinc.

15. A process of purifying gallium which comprises (a) extracting an aqueous solution containing gallium and other metals as impurities with an organic solvent containing N-organohydroxamic acid to provide an organic solvent solution containing N-organohydroxamic acid complexes of gallium and impurity metals; (b) blending of mixture of said organic solvent solution and an immiscible aqueous solution containing ammonia or an amine capable of complexing with said impurity metals; and (c) separating the organic solvent solution and aqueous solution with retention of gallium complexes in the organic solvent.

16. A process of purifying gallium which comprises (a) extracting an aqueous solution containing gallium and other metals as impurities with an organic solvent containing N-organohydroxamic acid to provide an organic solvent solution containing N-organohydroxamic acid complexes of gallium and impurity metals; (b) blending a mixture of said organic solvent solution and an immiscible aqueous solution having a pH between 0.5 and 12 to preferentially maintain the gallium complexes and not the impurity metal complexes; and (c) separating the organic solvent solution and aqueous solution with retention of gallium complexes in the organic solvent.

17. A process according to claim 16 wherein said immiscible aqueous solution contains sufficient gallium so that the amount of gallium in the mixture exceeds the molar ratio of one gallium atom for each three hydroxamic acid groups.

18. A process according to claim 16 wherein said immiscible aqueous solution contains sufficient acid so that the mixture has a pH of at least 1.

19. A process according to claim 16 wherein said immiscible aqueous solution contains sufficient acid so that the mixture has a pH of at least 2.

20. A process according to claim 16 wherein said N-organohydroxamic acid is an N-alkyl hydroxamic acid.

21. A process according to claim 16 wherein said other metals include at least one of silver, zinc, tin, cadmium, nickel, copper, mercury and iron.

* * * * *